United States Patent
Park

(10) Patent No.: US 10,046,502 B2
(45) Date of Patent: Aug. 14, 2018

(54) PLASTIC TUBE SCREEN FILLS AND FABRICATION THEREOF

(71) Applicant: Chong Mook Park, Falls Church, VA (US)

(72) Inventor: Chong Mook Park, Falls Church, VA (US)

(73) Assignee: Chong Mook Park, Falls Church, VA (US)

( * ) Notice: Subject to any disclaimer, the term of this patent is extended or adjusted under 35 U.S.C. 154(b) by 491 days.

(21) Appl. No.: 14/070,821

(22) Filed: Nov. 4, 2013

(65) Prior Publication Data
US 2015/0123297 A1    May 7, 2015

(51) Int. Cl.
| | |
|---|---|
| *B01F 3/04* | (2006.01) |
| *B29C 49/00* | (2006.01) |
| *B29C 49/04* | (2006.01) |
| *F28F 21/06* | (2006.01) |
| *F28F 25/08* | (2006.01) |
| *F28D 3/04* | (2006.01) |
| *F28F 1/06* | (2006.01) |
| *B29K 101/00* | (2006.01) |
| *B29L 16/00* | (2006.01) |

(Continued)

(52) U.S. Cl.
CPC .......... *B29C 49/0015* (2013.01); *B29C 49/04* (2013.01); *F28D 3/04* (2013.01); *F28F 1/06* (2013.01); *F28F 21/06* (2013.01); *F28F 25/082* (2013.01); *B29K 2027/06* (2013.01); *B29K 2101/00* (2013.01); *B29L 2016/00* (2013.01); *B29L 2023/18* (2013.01)

(58) Field of Classification Search
CPC ....... B01F 3/04; B29C 49/0015; B29C 49/04; B29D 16/00; B29K 2027/06; B29K 2101/00; B29L 2016/00; B29L 2023/18; F16L 3/22; F28F 1/08; F28F 1/06; F28F 21/06; F28F 25/082; F28D 3/04
USPC .................... 261/108, 112.1, 112.2, DIG. 72
See application file for complete search history.

(56) References Cited

U.S. PATENT DOCUMENTS

| | | | | |
|---|---|---|---|---|
| 538,557 | A * | 4/1895 | Theisen | .................... F28C 1/00 |
| | | | | 159/13.4 |
| 2,344,560 | A * | 3/1944 | Palkin | ...................... B01D 3/28 |
| | | | | 261/112.1 |

(Continued)

*Primary Examiner* — Charles Bushey
*Assistant Examiner* — Scott Bushey

(57) ABSTRACT

The present invention involves a fabrication of plastic-tube-screen-fill using plastic tubes. The plastic-tube-screen-fill consists of several plastic tubes suspended to between top and bottom ring-shaped hole perforated frames in the shape of a rectangular thin plate as a vertical string screen. The top and bottom ring-shaped hole perforated frames are in same configuration to be used in two ways and fabricated by assembling a cup-shaped hole perforated frame and tube-holder-frame. The tube-holder-frame is a male push-fit band connector with several short solid rods positioned and fixed on band for push-fitting into the cup-shaped holes on the cup-shaped hole perforated frame. The solid rod on tube-holder-frame has a male push-fit connector on its lower part to be push-fitted into one edge of tube. The tubes used in the present invention are spiral corrugated tubes. Fabrication and assembling method of perforated frames, tube-holder-frames, and spiral corrugated tubes are described in this invention.

17 Claims, 11 Drawing Sheets

(51) Int. Cl.
  *B29L 23/18* (2006.01)
  *B29K 27/06* (2006.01)

(56) References Cited

U.S. PATENT DOCUMENTS

| | | | | | |
|---|---|---|---|---|---|
| 3,122,171 | A * | 2/1964 | Britton | ............... | B29C 53/78 138/122 |
| 3,508,608 | A * | 4/1970 | Roe | ............... | C02F 1/043 165/111 |
| 3,589,518 | A * | 6/1971 | Brebion | ............... | B01D 46/02 210/150 |
| 3,704,869 | A * | 12/1972 | Priestley | ............... | B01J 19/32 210/150 |
| 3,762,468 | A * | 10/1973 | Newson | ............... | F28F 1/42 138/38 |
| 3,795,388 | A * | 3/1974 | Toth | ............... | F28C 1/02 261/112.1 |
| 3,898,922 | A * | 8/1975 | Savage | ............... | F24F 3/16 261/112.1 |
| 4,132,264 | A * | 1/1979 | Furlong | ............... | F28C 1/14 138/122 |
| 4,252,752 | A * | 2/1981 | Flandroy | ............... | F28B 1/06 165/175 |
| 4,385,012 | A * | 5/1983 | Priestley | ............... | B01J 16/005 202/158 |
| 4,477,394 | A * | 10/1984 | Armstrong | ............... | F28F 25/085 210/150 |
| 4,519,448 | A * | 5/1985 | Allo | ............... | F28D 3/02 165/118 |
| 4,641,706 | A * | 2/1987 | Haynie | ............... | B01D 5/0012 165/118 |
| 4,788,020 | A * | 11/1988 | Yampolsky | ............... | B01D 3/008 261/112.1 |
| 4,932,468 | A * | 6/1990 | Ayub | ............... | F28D 3/02 159/13.2 |
| 4,980,098 | A * | 12/1990 | Connery | ............... | B01J 4/002 159/13.4 |
| 5,535,989 | A * | 7/1996 | Sen | ............... | B01D 3/008 261/112.1 |
| 5,693,383 | A * | 12/1997 | Basse | ............... | B01J 19/32 261/94 |
| 6,883,596 | B2 * | 4/2005 | Kim | ............... | F25B 39/04 159/13.3 |
| 7,252,693 | B2 * | 8/2007 | Rostrup-Nielsen | ............... | B01J 8/009 165/177 |
| 8,177,975 | B2 * | 5/2012 | Schipper | ............... | B01D 19/0005 210/180 |
| 2012/0241988 | A1 * | 9/2012 | Park | ............... | F28F 25/087 261/112.1 |

* cited by examiner

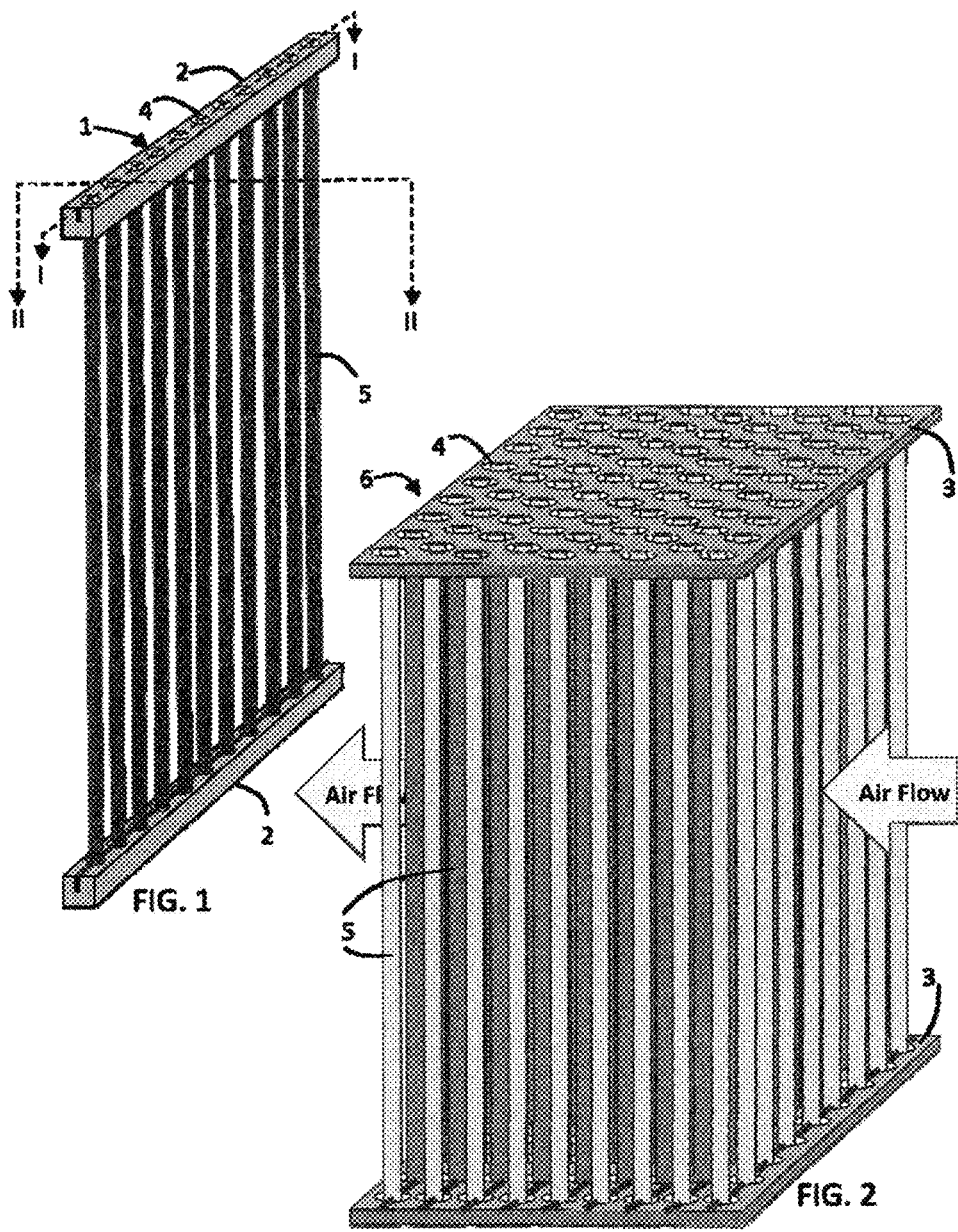

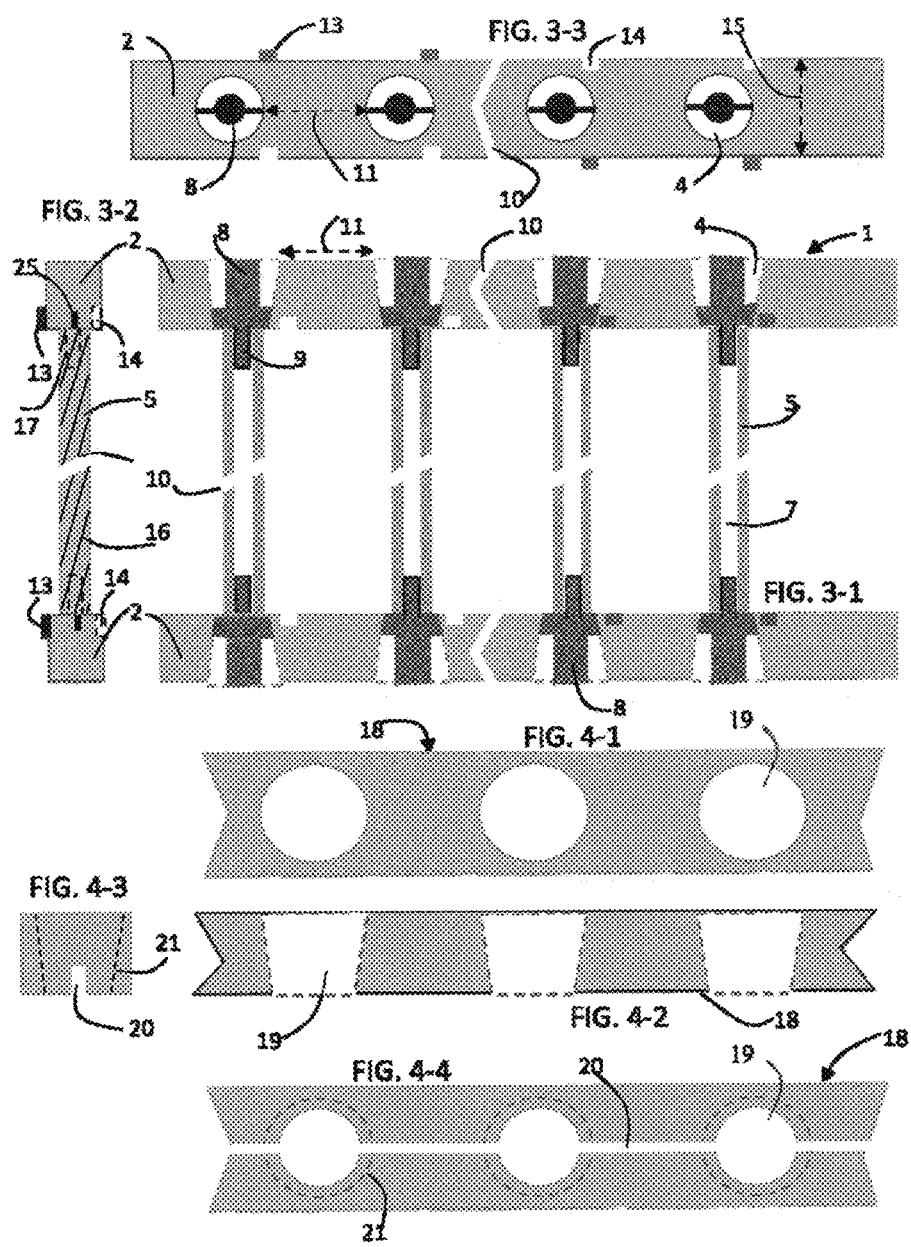

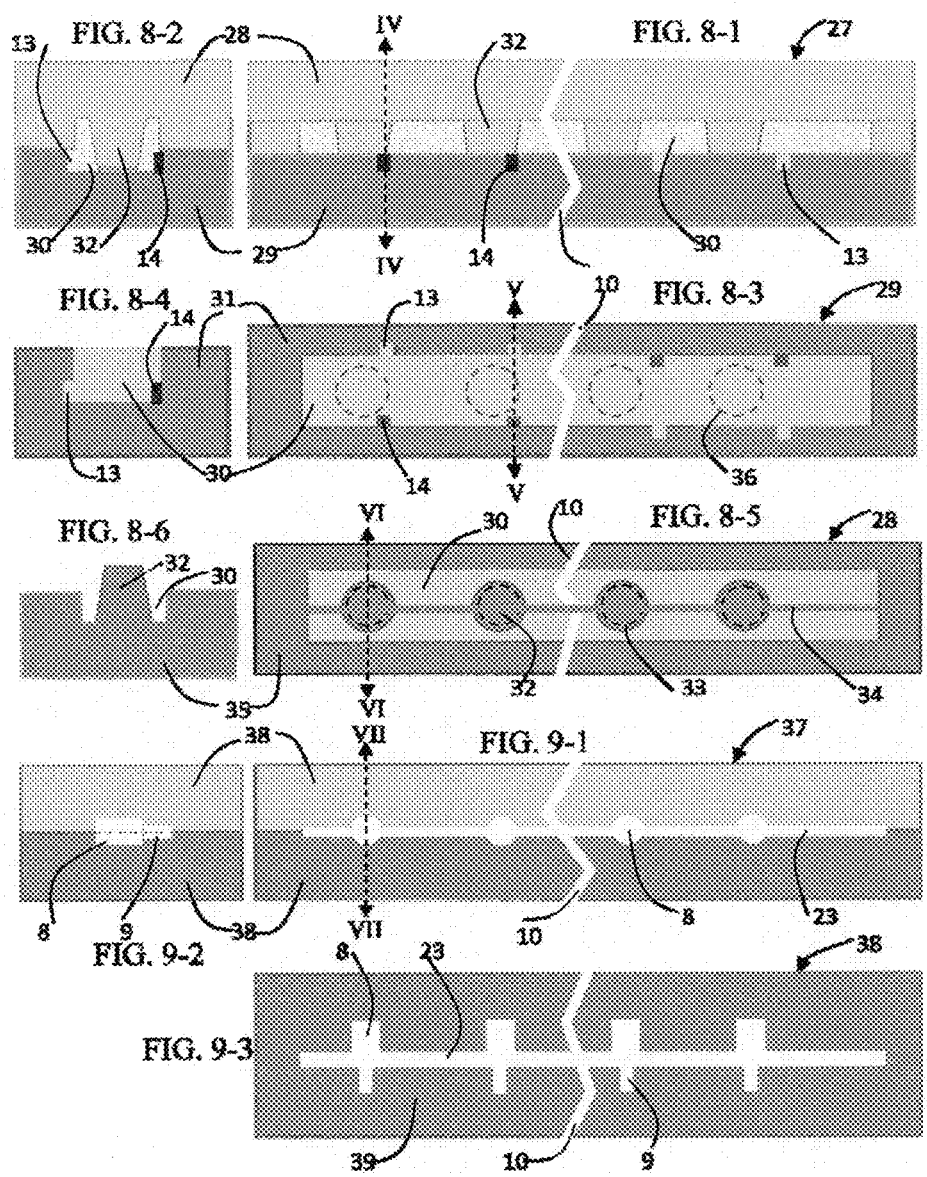

Notes: OD of tube is computed using ASTM D1785 data as follows
OD of tube = (minimum wall thickness/average ID x 2 + 1) NPS

PLASTIC TUBE SCREEN FILLS AND FABRICATION THEREOF

CROSS-REFERENCE TO RELATED APPLICATION

References Cited

U.S. Patent Documents

U.S. Pat. No. 8,973,908 B2 Mar. 10, 2015 Park
U.S. Application No. 61/726,928, Nov. 21, 2012. Park
U.S. Application No. 61/736,646, Dec. 13, 2012. Park
U.S. Application No. 61/820,102, May 6, 2013. Park
U.S. application Ser. No. 13/895,368, May 16, 2013. Park
U.S. application Ser. No. 13/888,327, Jun. 6, 2013. Park Foreign Patent Documents

| KR | 100393126 | Jul. 18, 2003 | Park |
|---|---|---|---|
| KR | 100516391 | Sep. 14, 2005 | Park |
| KR | 100516392 | Sep. 14, 2005 | Park |
| PCT | WO 2005/008159 A1 | Jan. 27, 2005 | Park |

Other Publications

Dominick V. Rosato, et al, Injection Molding Handbook, 3$^{rd}$ Edition, Kluwer Academic Publishers, Norwell, Mass. 02061, USA.
Robert A. Malloy, Plastic Part Design for Injection Molding An Introduction, Department of Plastic Engineering, University of Massachusetts, Lowell, Mass. 01854, USA.
The plastic extrusion process for tube, hose, pipe, and rod, Http://dehwa.comne.kr/mold/mold.htm.
Cooling Tower Depot, Cross Flow Fill With Louver or Drift Eliminator, http://www.streamlineextrusion.com/files/manuals/paper4.pdf.
Star Cooling Towers, Counterflow and Crossflow Film Fills, http://starcoolingtowers.com/coolingtowerfill
Corrugated Metal Panels/Corrugated Metal, http://www.corrugatedmetal,com/corrugated-metal-panels/
Tower Performance, Inc. Film Fills-C.E. Shepherd Company, http://www.process-cooling.com

BACKGROUND OF THE INVENTION

Field of the Invention

The present invention relates to fabrication of plastic tube screen fill media for use in evaporative water cooling and air refreshing apparatuses. More precisely, the present invention relates to the screen type plastic tube fills, being able to be used in evaporative cooling apparatus such as open loop cooling towers, evaporative chiller or cooler, and in airborne fumes removal apparatus like ammonia gas removal apparatus used in livestock facilities, which are fabricated with plastic tubes.

Description of the Related Art

The fill media used in an evaporative water cooling and air cooling apparatuses like cooling tower, evaporative chiller or air cooler, and flue gas removal apparatuses are string screen fills (SSF) and plastic-rod-screen-fills (PRSF) which are recently applied to U.S. patents (U.S. Pat. No. 8,973,908 B2, application Ser. No. 13/888,327), and honeycomb style commercial fabric cooling pad. The SSF and PRSF are invented by the present inventor and the present invention directly relates to the SSF and PRSF, since the present invention is invented to exclude their disadvantages of fabrication. The SSF is in thin plate type and made by winding one long string over a rectangular aluminum frame of the SSF and the PRSF is fabricated using solid plastic rods. The former has disadvantages such as high fabrication cost and difficulty to provide mass production within a relatively short time because of using two steps of manufacturing lines. The later was invented to reduce the former's disadvantages, but still it has a weakness in the reduction of manufacturing cost. The fabrication methods of the SSF and PRSF are described in detail in the previous patents of the present inventor (U.S. patent application Ser. No. 13/888, 327, U.S. Pat. No. 8,973,908 B2). As the PRSF employs solid rods, the high manufacturing cost cannot be avoided for fabrication of large PRSFs fabricated using large solid rod, whose solid rod needs a large amount of plastic materials, compared with tube. To eliminate such a problem to cause unexpected high manufacturing cost of plastic screen fill media, the plastic solid rods used in the PRSF must be replaced with plastic tubes. Namely, a plastic-tube-screen-fill (PTSF) must be fabricated. For the fabrication of small size rod or tube fill media, the PRSF fabrication is preferred, because the one step fabrication cost of PRSF is cheaper than three step fabrication cost of the PTSF as described in the section of Detailed Description of Preferred Embodiment. Hence, there is a size criterion of rod for the fabrication cost of PRSF to be higher than that of PTSF, considering their costs of required materials and fabrication costs due to fabrication method. For the fabrication of larger size rod fill media than the size criterion of rod, the PTSF fabrication method is employed to minimize the fabrication cost of large size fill media.

The PRSF is fabricated by one step casting of molten plastics into a plastic-rod-screen-fill molder, which has a hollowed cavity of the PRSF in one structure, using plastic injection molding machine. Such one step injection molding method is possible for fabrication of PRSF using plastic solid rods, as solid rods can be molded using the injection molding machine. However, the one step injection molding method is not applicable to the fabrication of PTSF, because the tube cannot be molded using the injection molding machine. Therefore, the plastic tubes must be inserted into the tube holders of the tube-holder-frame of PTSF, after the tube-holder-frame and tubes are separately fabricated. To achieve such an aim of fabrication of PTSF using plastic tubes, the fabrication method of PTSF is invented in the present invention.

<Review current and previous patents related with this invention>

The air and water contact plastic fill media of the cooling tower currently and commonly in use are fabricated by assembling of corrugated PVC films separated with proper spacing between adjacent PVC films assembled in the fill media. Since the corrugated PVC films are jointed by glue or any other methods, the top surface of the fill media becomes honeycomb shape surface like top surface of the cellular fill media shown in a reference of http://www.process-cooling.com, Tower Performance, Inc. Film Fills-C.E. Shepherd Company. Consequently, the top surface of the PVC film fill media is in a honeycomb shape so that sprayed water does not evenly flow down into the fill media through the entire top surface of the fill media, resulting in that the water does not uniformly flow down on the surface of the fill media and that some water freely passes down the fill media without flowing down on the surface of the PVC films. As results of unevenly flowing down on the surface of the film fills and free passing through the film fill media of sprayed water, the cooling efficiency of hot water becomes low. Such a structure of the top surface of the current fill media unable to uniformly distribute the supplied water over the entire top surface of the fill media and for water drops to free pass down through the fill media is a significant drawback of the current film fill media being necessary to be improved. There are a number of patents related with air and water contacting apparatuses such as Donn B. Furlong's Plastic Heat Exchange Tube, Ronald Priestley's Gas/Liquid Film Contact Apparatus, E. Theisen's Apparatus for Condensing or Evaporating And Refrigerating Fluids, R. C. Roe's Condenser Tubes, P. S. Britton's Flexable Plastic Tubing, Ronald Priestley's Gas-Liquid Contact Apparatus, George Brebion's Packing Materials Especially for Biological, etc, but the top surfaces of most of them are in the similar shapes. Some of them are reviewed focusing on the structural configuration of the top surface of the air and water contactor as follows.

The Plastic Heat Exchange Tube applied for a dry cooling section of cooling tower exampled in Donn B. Furlong's patent is in a structure comprising of a plurality of open end tubes vertically arranged in transversely extending rows and mounted between a bottom floor of basin and top horizontal partition deck with upper inlet heads of tubes positioned over the partition deck, Water distribution box is hung over the tubes and ambient cooling air transversely flows outside of tubes to cool them. Therefore, in operation, the water sprayed over the top open end of tubes fills the basin up to the open end of the tubes and then flows over the open end of tubes enter inside of tubes to flow downward on the inside wall of the tubes, whose inside surfaces are formed of spiral ribs and air transversely passes through outside the tubes. Consequently, the water and air do not contact directly each other. Major drawback of this heat exchanger is a difficulty of construction like a direct mounting of tubes between the upper and lower plates by inserting top and bottom ends of tubes into holes on the bottom basin and top deck. When a multiplicity of tubes are more closely installed to improve cooling efficiency, such construction may be impossible. Such problem can be solved by fabrication method employed in the present invention.

The Gas/Liquid Film Contact Apparatus patented by Ronald Priestly is formed of the array of corrugated tube columns, fabricated by joining of two sheets formed of half tube-shaped corrugated surfaces consists of vertically arranged columns of tubes and a top surface comprising an array of circular open ends of tubes connected by plate along the length of tube between adjacent tubes as shown in FIG. 4 in his patent, so that the top surface of the gas/liquid film contact apparatus has an array of wire rings connected by wire, having most open surface without close space, resulting in that a large portion of the liquid sprayed over the top of the gas/liquid film contact apparatus is free falling downwards through open space between and inside the tubes.

Air and Water Contacting Apparatus patented by Eduard Theisen consists of top water supply tray, bottom water collection tray, and tubes placed between top and bottom trays. The water supplied in top tray is imbibed through slots between top rims of tubes and nozzles to flow downwards over the inner corrugated surfaces of the tubes, and air flowing upwards through bottom nozzles projecting up into the lower ends of the tubes. Since the contact of air and water occurs on the inner surfaces of the tubes only, relatively a large amount of air discharges out of the apparatus without contacting with water flowing down on the inner surfaces of the tubes because no turbulence of air occurs due to free passing through the inside room of the tubes except inner surfaces and because of countercurrent of air to the flow of water.

Gas-Liquid Contact Apparatus patented by Ronald Prestley (U.S. Pat. No. 3,878,272) consists of an array of tubes, linked together in some cases by linking webs, downwards the outside and inside corrugated surfaces of which liquid can flow. These columns are arranged vertically in use. The gas may flow concurrent or countercurrent to the flow of liquid. Observing the arrangement configuration of hollow tubes in the apparatus, the top surface of this apparatus is in shape of string webs so that supplied liquid cannot be distributed over the entire cross section of the apparatus and large portion of supplied water free passes downwards through the column as in the form of liquid drops. Namely, the structure of top surface of this Gas-Liquid Contact Apparatus is similar with that of current commercial cooling towers. Other drawbacks of this apparatus are that the gas smoothly passes upwards through the tubes without turbulence of gas flow due to smooth straight surface of corrugated grooves on the tubes and that this apparatus cannot be used for cross current system.

Packing Materials Especially for Biological Filters patented by Georges Brebion (U.S. Pat. No. 3,589,518) is a gas and liquid contactor used for biological filters. A single unit consisting of several hollow square or any shape subsections formed tubes with thin walled structure throughout the height of the single unit is inserted in cellular tubes, which are vertically assembled side by side by welding or gluing the units constituting the gas and liquid contactor. Hence, the top surface structure of the gas and liquid contactor is in the similar structure with honeycomb structure of the current cooling towers. Also, this gas and liquid contactor does not allow the cross current contacting of gas and liquid because gas cannot flow transversely through the fill media.

As results of reviewing the published patents related with this invention, it is understood that most of the gas and liquid contactors reviewed above have the similar contacting modes of gas and liquid countercurrently flowing upwards and downwards to each other within the tubes vertically suspended and that they have two types of top surface structures: one type of surface structure is in the shape of a string screen surface consisting of an array of wire rings connected by wire and the other type is a perforated plate with top ends of tubes inserted into the holes on the perforated plate. The former top surface structure has almost all unclogged surface like a shape of string web window screen so that a large portion of the liquid sprayed over the top of the gas and liquid contactors is free falling downwards along the unclogged channels between and inside the tubes while small portion of liquid flows down on the inner corrugated surfaces, while the latter top surface structure is a perforated plate which is a bottom perforated plate of a liquid-receiving tray consisting of a plurality of holes with top ends of tubes made of inner and outer corrugated surfaces tightly inserted into the holes of the perforated plate and also kinds of orifice nozzles are inserted into the hole of the tubes tightly inserted in the holes of the perforated plate being able to control liquid to flow over into the tubes to flow downwards on the inner surfaces of the tubes. Considering the countercurrently flowing pattern of gas and liquid inside the tubes, contacting effects of gas and liquid of the patented gas and liquid contactors are low, since a large portion of the gas flowing upwards through central inner space of the tubes do not have chance of contacting with liquid due to their countercurrent flowing pattern (except Furlong's apparatus) and not crosscurrent flowing patterns. Consequently, such significant drawbacks of the patented gas and liquid contact apparatuses are required to be improved. To improve such drawbacks of the current cooling towers' air and water contactor and patented gas and liquid contact apparatuses reviewed above, plastic-tube-screen-fills and plastic-tube-screen-fill packs, having capabilities of liquid flowing downwards on the outside corrugated surfaces of the tubes to directly contact with gas transversely flowing to the descent direction of liquid through outside tubes vertically suspended top and bottom perforated plates of the plastic-tube-screen-fill pack, are invented and disclosed in the present invention.

The PTSF pack of the present invention is in a shape of rectangular column and comprises of top and bottom perforated plates and a plurality of surface-corrugated tubes vertically suspended to between the top and bottom perforated plates as shown in FIG. 2, which is applicable to fabrication of gas and liquid contactors to be used in cooling towers and other facilities removing of special components from gases by bringing in direct contact with absorption liquids or water. FIG. 2 shows that both edges of the tubes are inserted into holes on the top and bottom perforated plates as shown in Furlong's and Theisen's patents. If the perforated plates of the PTSF pack are made of plate in one large piece like bottom and top plates shown in their patents, the fabrication of one PTSF pack requires a large amount of time for completing one PTSF pack. Therefore, to avoid such a problem, the one-piece perforated plate is sliced into a number of thin perforated frames as a rectangular plate shaped PTSFs shown in FIGS. 1 and 17-2, each of perforated frames including one line of holes on the perforated plate. After rod screen plates are made of by inserting both edges of tubes into two perorated frames, the rod screen plates are assembled side by side to fabricate the package which is same with the package made of with one-piece perforated plates. Since such a fabrication method of assembling the rod screen plates side by side does not require a long fabrication time, a number of packages can be fabricated within a short period. Hence. in this invention, the PTSFs are made first and then the PTSFs are assembled to fabricate the PTSF packs. The PTSF pack has a structure of perforated plate comprising of a plurality of ring-shaped holes with end closed top portion of tubes placed at the center of the ring-shaped holes. The ring-shaped hole perforated plate directs all of liquid supplied on the perforated plate to be uniformly imbibed through the ring-shaped holes to flow down on the surface of end closed tubes by the surface tension of tubes and to bring in direct contact with gas to be cool or to absorb airborne fume gas on the outside surface of tubes. However, Furlong's gas and liquid contactor drives liquid over top edge of tubes to flow down inside tubes and gas to flow outside tubes so that liquid and gas are not contacted each other, resulting in that liquid cooling efficiency is low due to heat transfer resistance of tube wall. Such gas and liquid contacting modes between Furlong's and PTSF pack liquid and gas contactors are significantly distinguished from each other. Namely, PTSF pack's structure of liquid inlet portion of top perforated plate is ring-shaped holes surrounding the top end closed portion of tubes and Furlong's liquid inlet structure is an open end hole of top portion of tubes stock out of top perforated plate without any hole surrounding tubes. Therefore, the PTSF pack is concluded to be an unique gas and liquid contactor comprising of top perforated plate made of ring-shaped holes with tubes placed at the center of the ring-shaped holes, which has a function of supplied liquid over the ring-shaped hole perforated plate to be imbibed through the entire ring-shaped holes to flow down on the surfaces of the tubes and has not ever been employed in the previous gas and liquid contactors.

The purpose of the present invention is a fabrication of the PTSF, for use in fabrication of PTSF pack, being able to eliminate a problem to cause the high manufacturing cost of PRSF and to improve the drawbacks of the gas and liquid contactors described above. Another purposes of the present invention provide a manufacturing method of new cooling fill media, for replacement of current commercial evaporative cooling media to reduce construction and maintenance cost of the current cooling tower, and new cooling pads to be employed for construction and replacement of current cooling pads of livestock confined facilities able to increase cooling efficiency and to remove ammonia gas ventilating to atmosphere out of the facilities.

SUMMARY OF THE INVENTION

The plastic-tube-screen-fill, PTSF, of the present invention consists of top and bottom ring-shaped hole perforated frames embedding tube-holder-frames and tubes (spiral corrugated tubes and plain tubes), which are assembled in the shape of rectangular plate with tubes vertically suspended to between the top and bottom ring-shaped hole perforated frames as shown in FIG. 1. The PTSFs are used for fabrication of a rectangular columnar pack, PTSF pack, shown in FIG. 2, whose fabrication method and operational function are same with those of PRSF pack invented by the present inventor, but the fabrication method of the PTSF is different from that of the PRSF. See the U.S. patent application Ser. No. 13/888,327 for the description of the fabrication method and operational functions of the PRSF pack. The fabrication of PTSF is described in detail in the present invention, while the fabrication of the PTSF pack is simply described bellow.

<Designing of PTSF>

The PTSF of the present invention shown in FIG. 1 is the basic unit of PTSF which looks like a string screen and a configuration of PTSF is illustrated in FIGS. 3-1, 3-2, and 3-3. FIG. 3-1 illustrates left and right side partial schematic views of cross section I-I of PTSF shown in FIG. 1, FIG. 3-2 shows the schematic view of cross section II-II of PTSF shown in FIG. 1, and FIG. 3-3 illustrates the left and right side partial schematic top view of top and bottom frames of PTSF. Hence, the PTSF is fabricated by assembling five pieces, top and bottom frames, top and bottom tube-holder-frames, and tubes. The PRSF comprises of three parts, top and bottom frames and solid rods suspending from between them, but they are made in one piece instead of assembling five pieces to be used to fabricate PTSF. As it is in one structure with solid rods, the PRSF is molded by casting molten plastics into a PRSF fabrication molder using an injection molding machine. However, the PTSF of the present invention is made of tubes instead of solid rods and the holes in the perforated frame are perfect holes, so that one step injection molding method being used to fabricate PRSF is not applicable to the fabricating of PTSF. Therefore, the top and bottom perforated frames, top and bottom tube-holder-frame, and tubes of PTSF are separately fabricated and then assembled into one structure.

The top and bottom cup-shaped hole perforated frames have same configuration as shown in FIGS. 4-1, 4-2, 4-3, and 4-4. Hence, only one cup-shaped hole perforated frame is fabricated by using the injection molding machine and then used as the top and bottom cup-shaped hole perforated frames. To meet this condition, as shown in FIG. 3-1, the cup-shaped holes near both edges of the cup-shaped hole perforated frame are placed differently apart from the edge of the perforated frame in order to use the perforated frame in two ways. Namely, the first cup-shaped hole from one side edge of the perforated frame is placed at ¼ spacing of a regular spacing between adjacent cup-shaped holes in the middle of the perforated frame and the first cup-shaped hole from other side edge of the perforated frame is placed at the ¾ regular spacing. Such arrangement of the cup-shaped holes on the perforated frame is helpful to provide top and bottom staggered hole perforated plate of the PTSF pack when the PTSFs are assembled to fabricate the PTSF pack by attaching one PTSF to the other PTSF horizontally rotated by 180 degree. See U.S. patent application Ser. No. 13/888,327 for the detailed description of the rotational attachment method. Next, the fabrication of the tube-holder-frame is described.

The configurations of the top and bottom tube-holder-frames are same as shown in FIGS. 5-1, 5-2, and 5-3, and one kind of tube-holder-frames are fabricated as shown in FIG. 5-1 and used as top and bottom tube-holder-frame. Tube-holder-frame consists of a long male push-fit band connector and a number of tube holders, which are in one structure. A number of tube holders are attached on the male push-fit band connector and the tube holders are placed at regular spacing between adjacent tube holders along the length of the male push-fit band connector as shown in FIG. 5-3. The tube holders near both edges of the tube-holder-frame are placed along the tube-holder-frame in a same way as the cup-shaped holes of the cup-shaped hole perforated frame are placed along the cup-shaped hole perforated frame. The tube holder is comprised of solid rod as an upper part of tube holder and male push-fit tube connector as a lower part of tube holder as shown in FIGS. 5-1 and 5-2. As shown in FIGS. 5-1 and 5-2, the solid rod is formed in a cylindrical shape to be inserted into a cup-shaped hole on the cup-shaped hole perforated frame to create a ring-shaped hole shown in FIG. 3-3. The male push-fit tube connector is formed like a cylindrical attachment faucet to fit into male hole of an attached tube, attached to the underside of the solid rod of tube holder as shown in FIGS. 5-1 and 5-2. The male push-fit band connector is as long as length of the tube holder frame and inserted into the female push-fit band connector on the underside of cup-shaped hole perforated frame. The male push-fit band connector is placed on the longitudinal axis of the tube-holder-frame passing through the centerlines of the male push-fit tube connectors of the tube holder of the tube-holder-frame as shown in FIGS. 5-1, 5-2, and 5-3. And also the female push-fit band connector is placed on the longitudinal axis of the cup-shaped hole perforated frame passing through the centerlines of the cup-shaped holes on the underside of the cup-shaped hole perforated frame as shown in FIGS. 4-3 and 4-4. The ring-shaped hole perforated frame described above is in a shape of square bar and formed of a number of ring-shaped holes, having solid rods of the tube holders at the center of the ring-shaped hole, which are placed at regular spacing between adjacent ring-shaped holes along the length of the ring-shaped hole perforated frame and interlocking attachment tabs are made on the left and right side surfaces, top and bottom surfaces, and end surfaces of ring-shaped hole perforated frames, The tubes used in the present invention are plain tubes with smooth tube surface and spiral corrugated tube with spiral wavy corrugated surface. The spiral corrugated tube is illustrated in FIG. 6. The spiral corrugated surface forms waves repeating bumps and grooves whose flute directions are slanted to the longitudinal length of the tube. The slant angle, 30 degree, of the corrugated flute is preferred in the present invention. Such perforated profile of tube surface offers stronger tube in any gauge thickness and large surface area of contacting water and air, and spiral corrugated surface increases the contacting time of water and air due to longer flutes for water to pass. Hence, the spiral corrugated tube is preferred in the present invention. Providing such essential advantages, the corrugated tubes are employed to increase a contacting time of air and water and their contacting area on the surface of tube, and to strengthen the tubes using thinner PVC film for saving of raw PVC material. However, there is a slant angle of the flutes to provide an optimum condition of water to flow down through the grooves of corrugated tube. The smaller slant angle provides a smaller length of the corrugated groove, while larger slant angle provides a longer length of groove. But the larger slant angle allows water to jump over the corrugated bumps instead of flowing down along the grooves. The corrugated grooves must be deep enough for water to flow down along the corrugated grooves, but if too deep, water flows over the grooves, because the peak of corrugated bumps are close each other. Conversely, if the grooves are shallow, the water flows over the corrugated grooves and the surface area is not significantly different from that of plain tube. Hence, the corrugated grooves on the surface of corrugated tube require optimum slant angle and depth of groove, which are described in the sections of <Fabrication of Spiral Corrugated Lines on Surface of Tube> and Detailed Description of the Preferred Embodiment. See the reference of www.corrugatedmetal.com for more information of the corrugated profile and terminology of corrugated surface.

<Fabrication of PTSF>

The fabrication of PTSF is accomplished by assembling the cup-shaped hole perforated frames, tube-holder-frames, and spiral corrugated tubes. Their assembly is performed by following an assembly procedure, STEP 1 through 3 as shown in FIG. 7. In STEP 1, two of the ring-shaped hole perforated frames are fabricated by assembling cup-shaped hole perforated frames and tube-holder-frames. In STEP 2, an assembly process of joining one end of the tubes with push-fit tube connectors of the ring-shaped hole perforated frame is conducted, and other ring-shaped hole perforated frame is assembled with other edges of the tubes whose one edges joined previously with the push-fit tube connectors of the ring-shaped hole perforated frame as shown in a final STEP 3. Through the assembly procedure of STEP 1 to 3, the PSTF shown in FIGS. 3-1, 3-2, and 3-3 is fabricated.

<Fabrication of PTSF Pack>

The PTSF pack shown in FIG. 2, which is installed in a cross current cooling systems like a cooling tower, has a rectangular column structure comprising of top and bottom ring-shaped hole perforated plates and a plurality of rods vertically suspended to between the top and bottom ring-shaped hole perforated plates, which is fabricated by assembling side by side of a number of PTSFs shown in FIG. 1. The holes on the ring-shaped hole perforated plates of the PTSF pack are ring-shaped holes with rods placed at their centers. The schematic pictures of the PTSF is in the shape of upright thin rectangular plate consisting of top and bottom ring-shaped hole perforated frames and plastic tubes vertically attached to between the top and bottom ring-shaped hole perforated frame. The plastic tubes are lined up at regular spacing along the ring-shaped hole perforated frame of the PTSF so as to be in the shape of tube screen plate as shown in FIG. 1. The thickness of the PTSF is determined to be same with outer diameter of tube used for its fabrication, which is mainly in the range of 2.5 to 25 mm, other ranges are possible. To fabricate PTSF and PTSF pack, basic size and PTSF spacing of the PTSF pack are necessary and determined to be 305(1', Depth)×305(1', Width)×1220(4', Height) mm and 19 mm (0.75 inches), respectively, which are recited from commercial cooling tower fill media. The PTSF shown in FIG. 1 is used as a basic fill media for fabricating of a basic PTSF pack shown in FIG. 2, which shows a schematic picture of the PTSF pack fabricated by assembling a number of PTSFs. The PTSF pack shown in FIG. 2 is a basic unit fill package to be used for fabricating of a cooling heat exchange or airborne fume gas removal fill media to be installed in the commercial cooling or airborne fume gas removal industrial facilities or apparatuses. The basic fill media PTSF shown in FIG. 1 is in the shape of plastic tube screen plate consisting of a number of plastic tubes lined up along the length of the frame. The plastic tubes consisted of in the PTSF are placed at regular spacing between the adjacent tubes along the longitudinal axis of the ring-shaped hole perforated frame. The plastic tube near the edge of the PTSF is apart from the edge of PTSF by ¼ tube spacing (interval between longitudinal axes of the adjacent tubes in PTSF), while that near the other side edge of PTSF apart by ¾ tube spacing, and the other tubes in the middle of PTSF frame are apart from each other at regular spacing. Such configuration of ring-shaped holes in the PTSF frame is suitable for the ring-shaped holes to be arranged in a zigzag conformation on the ring-shaped hole perforated plate of the PTSF pack, resulting in a zigzag arrangement of the tubes in the PTSF pack, when the PTSFs are assembled to fabricate the PTSF pack by joining PTSFs with horizontally rotating of every other PTSF by 180 degree.

<Fabrication of Molders>

To fabricate PTSF, the cup-shaped hole perforated frames, tube-holder-frames, and spiral corrugated tubes are necessary. The cup-shaped hole perforated frames and tube-holder-frames are made using the injection molding processes, while the spiral corrugated tubes are fabricated by employing an extrusion blow molding process. The fabrication of cup-shaped hole perforated frames needs upper and lower half molders. The lower half molder of cup-shaped hole perforated frame fabrication half molder is a molder fabricating the lower part of the cup-shaped hole perforated frame of PTSF, which is shown in FIGS. 8-3 and 8-4, and the upper half molder for fabricating the upper part of perforated frame is shown in FIGS. 8-5 and 8-6. The upper and lower half molders are designed to be overlapped and to easily remove the complete cup-shaped hole perforated frame out of cup-shaped hole perforated frame fabrication molder. On the lower half molder, the cup-shaped hole perforated frame, male and female attachment tabs are carved as shown in FIGS. 8-3 and 8-4. The light parts of lower half molder are the carved parts of cup-shaped hole perforated frame and male attachment tabs. The dark parts of the lower half molder are female attachment tabs and a body of the lower half molder. On the upper half molder, the upper part of perforated frame is carved to create cup-shaped humps fabricating cup-shaped cylindrical holes in the perforated frame to be located on the right position as shown in FIG. 3-1. The light parts of the upper half molder are the caved part of the frame and the dark parts are the cup-shaped humps and the body of upper half molder. Joining together of the upper and lower half molders becomes the perforated frame fabrication molder and creates a cavity of the perforated frame in the molder as shown in FIG. 8-1. The light parts created in the molder are the cavity of the perforated frame.

The upper and lower parts of the tube-holder-frame fabrication molder are same and so a half part of the tube-holder-frame is carved on each of upper and lower half molder as shown in FIG. 9-3. The white part in the upper or lower half molder shown in FIG. 9-3 is the carved half part of tube-holder-frame. Joining the upper and lower half molders together, the cavity of tube-holder-frame is created in the tube-holder-frame fabrication molder as shown in FIG. 9-1. The white part in the tube-holder-frame fabrication molder shown in FIG. 9-1 is the cavity of tube-holder-frame and FIG. 9-2 shows the cross section view of the cross section VII-VII shown in FIG. 9-1.

The wall thickness of the spiral corrugated tube is as thin as the current PVC cooling media is, which is in the range of 10 to 23 mils (0.15 to 0.345 mm, average=0.245 mm). Thus, in the present invention, the thickness of the spiral corrugated tube used is 0.25 mm. Such thin tube is fabricated by employing the extrusion blow molding process. Application of the extrusion blow molding process to the fabrication of spiral corrugated tubes of the present invention requires a split molder made of two half molders of spiral corrugated tube as shown in FIGS. 10-1 and 10-2. Two half molders, left and right half molders, are same in molding configuration and so they are carved in same configuration. One half molder is illustrated in FIG. 10-1, which is a schematic picture of its top view. Dark part is a body of half molder and white part is a carved half part of spiral corrugated tube. The cross sectional view of the cross section VIII-VIII on the spiral corrugated tube fabrication molder, fabricated by overlapping the two half molders, is shown in FIG. 10-2. FIG. 10-2 shows that the spiral corrugated fabrication molder can be splitted into split half molder—1 and 2, which is used as an extrusion blow molder in the extrusion blow molding process.

<Determination of Tube Size Criterion for PTSF>

Determination of tube size criterion for PTSF requires a comparison of total fabrication cost of PTSF and PRSF, which is determined by summation of marketing prices of materials and mechanical fabrication cost of rod (solid rod) and tube. In this comparison, the marketing prices of PVC tubes and rods are used instead of PVC raw material and collected from U.S. Plastics Inc as tabulated in Table 1. The mechanical fabrication cost

TABLE 1

Prices of PVC tubes (schedule 40) and rods as of August 2013(From U.S. Plastics, Corporation)

| | Tube | | | Rod |
|---|---|---|---|---|
| Size (in) | OD (in) | ID (in) | Price (dollars per foot) | price (dollars per foot) |
| ¼ | 0.54 | 0.354 | 0.55 | 0.7 |
| ⅜ | 0.675 | 0.483 | 0.72 | 0.84 |
| ½ | 0.84 | 0.608 | 0.44 | 0.95 |
| ⅝ | | | | 1.14 |
| ¾ | 1.05 | 0.804 | 0.59 | 1.06 |
| 1 | 1.305 | 1.033 | 0.87 | 2.78 |
| 1¼ | 1.66 | 1.363 | 1.17 | 4.32 |
| 1½ | 1.9 | 1.592 | 1.29 | 6.26 |

TABLE 1-continued

Prices of PVC tubes (schedule 40) and rods as of August 2013(From U.S. Plastics, Corporation)

| Size (in) | Tube | | | Rod |
|---|---|---|---|---|
| | OD (in) | ID (in) | Price (dollars per foot) | price (dollars per foot) |
| 1¾ | | | | 8.79 |
| 2 | 2.375 | 2.049 | 1.73 | 11.25 | of tube includes 3 step fabrication costs such as injection molding cost and two parts-assembling costs, but rod fabrication cost includes 1 step fabrication cost of injection molding. Under an assumption of 0.5 dollar/foot/rod or tube of each step, the mechanical fabrication costs of rod and tube are 0.5 and 1.5 dollars/foot, respectively, which are constant because the sizes of tubes and rods do not significantly affect the mechanical fabrication. However, the prices of rods rapidly increase as their sizes increase, while those of tubes slowly increase as shown in Table 1. To understand the effect of rod and tube sizes to their total fabrication costs, the variation of the total fabrication costs are plotted, using the prices of tubes and rods and assumption of mechanical fabrication costs, as shown in FIG. 11. Observing the variations of the total fabrication costs shown in FIG. 11, the small size fill media are preferred to be fabricated using small diameter rod PRSFs less than 0.5 inches in ID and the large size fill media preferred to be fabricated using large diameter tube PTSFs greater than or equal to 0.681 inches in OD. Eventually, the relatively small size apparatuses like evaporative chiller and cooler, air refresher, and small cooling tower prefer small diameter rod. PRSFs using less than 0.5 inches OD of rod for fabrication of their fill media, while the fill media of large and medium size cooling towers are fabricated with large diameter tube PTSFs using tubes of greater than or equal to 0.681 inches in OD of tube to minimize the amount of PVC. Therefore, the tube size criterion for PTSF is 0.681 inches outside diameter of tube applied to the fabrication of PTSF.

<Determination of Acceptable Tube Diameter for PTSF>

The necessity and determination method of the acceptable size of material used for fabrication of fill media like plastic strings or rods packs is described in U.S. patent (U.S. Pat. No. 8,973,908 B2) of the present inventor. Among the several factors for determination of diameter of strings and rods, key factors are the thickness of ring-shaped hole surrounding string or rod and the interval space between ring-shaped holes. The ring-shaped hole thickness is computed by multiplying a multiplication factor, 1.412 or 1.924, to the diameter of string or rod and subtracting their diameters and then being divided by 2. The ring-shaped hole space, interval between outer circle of ring-shaped hole is determined to be 0.394 inch which is added to ring-shaped hole thickness to equalize with average sheet spacing of current commercial cooling tower fill media. In the present invention, the ring-shaped hole thickness is determined by applying 1.924 for tubes of greater than or equal to 1.5 inches in diameter and 1.412 for tubes less than 1.5 inches to preserve optimum size ring-shaped holes for water to easily and evenly flow down through ring-shaped holes. The ring-shaped hole spacing for tubes of less than 1.5 inch in diameter is determined to be 0.394 and 0.572 is applied for tubes greater than and equal to 1.5 inch. Using these criteria, the specifications of tubes used for fabrication of PTSF, whose diameters are in the range of 0.1 to 1.75 inches, are determined as tabulated in Table 2. The determination of tube specification due to variation of tube sizes are described in detail in the section of Detailed Description of Preferred Embodiment. As a result of analyzing the specifications of tubes tabulated in Table 2, the specific surface areas of PTSF pack fabricated with tubes of 0.1 to 1.2 inches in outer diameter are not significantly different as they are in the range of 12 and 20 $ft^2/ft^3$ and the relatively large specific surface areas are gathered around the largest specific surface area, 20 $ft^2/ft^3$, of the tube of 0.251 inches. They are suitable for fabrication of PTSF, since the cooling effects of 12 to 20 $ft^2/ft^3$ of the PTSF pack are greater than those of the lowest specific surface area, 41 $ft^2/ft^3$, of the commercial PVC film fills pack having been used for the benchmarking experiment of verifying the cooling effect of SSF pack. See U.S. patent (U.S. Pat. No. 8,973,908 B2) for benchmarking experiment of SSF pack. However, for the tube diameters of greater than 1.2 inches, the specific surface areas of the PTSF pack rapidly decrease lower than 12 $ft^2/ft^3$ and therefore their cooling effects are lower than those of the commercial PVC film fill pack, which means the large tubes of greater than 1.2 inches in outer diameter are not suitable for fabrication of PTSF. Considering the tube size criteria and acceptable tube diameters described above, it is concluded that the acceptable tube sizes used for economical fabrication of PTSF are in the range of outside diameter 0.681 to 1.2 inches of tube.

<Fabrication of Spiral Corrugated Tubes>

The fabrication method of the spiral corrugated rods is described in detail in the previous patent, U.S. patent application Ser. No. 13/888,327 of the present inventor. In the present invention, a fabrication method of corrugated PVC tube shown in FIGS. 6 and 12, whose corrugated bumps are able to provide an optimum large surface area of tube, is described based on the dimension of NPS 1" PVC tube. The optimum large surface area means that the corrugated surface area of the spiral-corrugated-tube (SCT) is properly large and has properly wide and deep grooves enough for water to flow down along the corrugated grooves. To satisfy these conditions, the corrugated bump angle shown in FIG. 12 must not be small and not too large. FIG. 6 illustrates the schematic picture of the SCT and FIG. 12 shows the cross section view of the SCT which has 8 spiral corrugated bumps forming 8 diamond shapes by combining two isosceles triangles as shown in FIG. 12. The height or thickness of corrugated bump is made to be same with the thickness of NPS 1" PVC tube. As a result, the corrugated of bump peak spacing×corrugated thickness of 0.4994×0.136" is obtained. The corrugated bump angle and leg length of isosceles triangle of corrugated bump are respectively 142 degree and 0.2642(6.7 mm) inches computed from 45 degree isosceles triangle. Then, using this information, the surface area of 8 corrugated bump tube is computed to increase by 3.2%, compared with that of plain tube. Judging the results employing the optimum conditions of proper corrugated bump angles "not too small and not too large" and proper depth of groove "not too shallow depth", the fabrication of 8 corrugated bump on the surface of NPT 1" PVC tube is acceptable. The determination method of the optimum large surface area is described in detail in the section of Detailed Description of Preferred Embodiment. When 11 corrugated bumps are made on the surface of NPT 1" PVC tube, the surface area can be increased by 15% and the surface area of the 7 corrugated bumps tube is same with that of the plain PVC tube.

Advantages of Present Invention

One of major advantages of the present invention is the ability to substantially reduce the height of the PVC Fills pack by maximum 35% of its original height to meet the required temperature of the water to be cooled in the current PVC Fills packs because the entire surface area of spiral corrugated tube is used for contacting between water and cooling air to completely cool water and the cooling function of cooling air is totally employed for cooling water without being significantly resisted by the spiral corrugated tubes, thereby expecting to maximize heat exchange rate between water and cooling air.

Another major advantage of the present invention is the ability to save a large amount of PVC materials for fabrication of fill media since the spiral corrugated tube has thin film-like surface and entirely hollow inside of the spiral corrugated tube.

Yet another major advantage of the present invention is the ability to keep the spiral corrugated tube robust because the corrugated surface of the spiral corrugated tube strengthen the tube body.

Another major advantage of the present invention is the ability to cool the water much hotter than the warm water able to be cooled by the PTSF pack because the stack height of the PTSF packs piled can be extended without loss of their physical integrity or mechanical strength and because they can be of rugged construction with ability to withstand without their damage or loss of shape, since the cooling efficiency of the PTSF pack has much higher than that of the PVC Fills pack.

The spiral corrugated tube of the present invention still has other advantages for usage of PTSFs as fill media, which are same with those of PRSFs and described in the previous patent of the present inventor, U.S. Pat. No. 8,973,908 B2.

BRIEF DESCRIPTION OF THE DRAWINGS

FIG. 1 is a schematic picture of PTSF plastic tube screen fill.

FIG. 2 illustrates a schematic picture of PTSF pack fabricated by assembling a number of SFs.

FIG. 3-1 shows left and right partial schematic view of cross section I-I of plastic-tube-screen-fill shown in FIG. 1. FIG. 3-2 shows schematic view of side II-II of plastic-tube-screen-fill shown in FIG. 1. FIG. 3-3 shows left and right partial schematic view of top surface of top and bottom ring-shaped hole perforated frame of plastic-tube-screen-fill.

FIG. 4-1 illustrates mid-partial schematic picture of top surface view of top and bottom cup-shaped hole perforated frames of plastic-tube-screen-fill. FIG. 4-2 illustrates mid-partial schematic picture of side view of top and bottom cup-shaped hole perforated frames of plastic-tube-screen-fill. FIG. 4-3 shows side cross section view of top and bottom cup-shaped hole perforated frames of plastic-tube-screen-fills. FIG. 4-4 shows mid-partial schematic view of underside surface of top and bottom cup-shaped hole perforated frame of plastic-tube-screen-fill.

FIG. 5-1 is a mid-partial schematic picture of side view of top and bottom tube holder frame of plastic-tube-screen-fill. FIG. 5-2 shows view of cross section III-III of top and bottom tube holder frame of plastic-tube-screen-fill in FIG. 5-1. FIG. 5-3 shows top view of top and bottom tube holder frame of plastic-tube-screen-fill.

FIG. 8-1 is a side view of cup-shaped hole perforated frame fabrication molder joined upper and lower half molders together of cup-shaped hole perforated frame fabrication molder. FIG. 8-2 shows a schematic view of cross section IV-IV of cup-shaped hole perforated frame fabrication molder joined upper and lower half molders of cup-shaped hole perforated frame fabrication molder shown in FIG. 8-1. FIG. 8-3 illustrates a top view of lower half molder of cup-shaped hole perforated frame fabrication molder. FIG. 8-4 is a picture of cross section V-V of lower part of cup-shaped hole perforated frame fabrication molder shown in FIG. 8-3. FIG. 8-5 shows a top view of upper half molder of cup-shaped hole perforated frame fabrication molder. FIG. 8-6 is a picture of cross section VI-VI of upper half molder of cup-shaped hole perforated frame fabrication molder shown in FIG. 8-5.

FIG. 9-1 illustrates a side view of tube holder frame fabrication molder joined upper and lower half molders of tube holder frame fabrication molder. FIG. 9-2 is a picture of cross section VII-VII of tube holder frame fabrication molder shown in FIG. 9-1. FIG. 9-3 is a top view of upper and lower half molders of tube holder frame fabrication molder.

FIG. 10-1 shows a schematic top view of left and right half molders of extrusion blow molder for fabricating of spiral corrugated tube. FIG. 10-2 shows a view of cross section VIII-VIII of extrusion blow molder created by joining left and right half molders of spiral corrugated tube fabrication molder shown in FIG. 10-1.

FIG. 17-1 illustrates a partial top view (combined top ring-shaped hole perforated frames of two PTSFs) of top ring-shaped hole perforated plate of PTSF pack, FIG. 17-2 shows a side view of the PTSF pack consisting of top and bottom cup-shaped hole perforated plates and tubes vertically jointed with ring-shaped hole perforated frames by inserting push-fit tube connectors of ring-shaped hole perforated frames into the edges of tubes.

DESCRIPTION OF NUMBER IN THE DRAWINGS

Figures 1, 2, 3, 5:
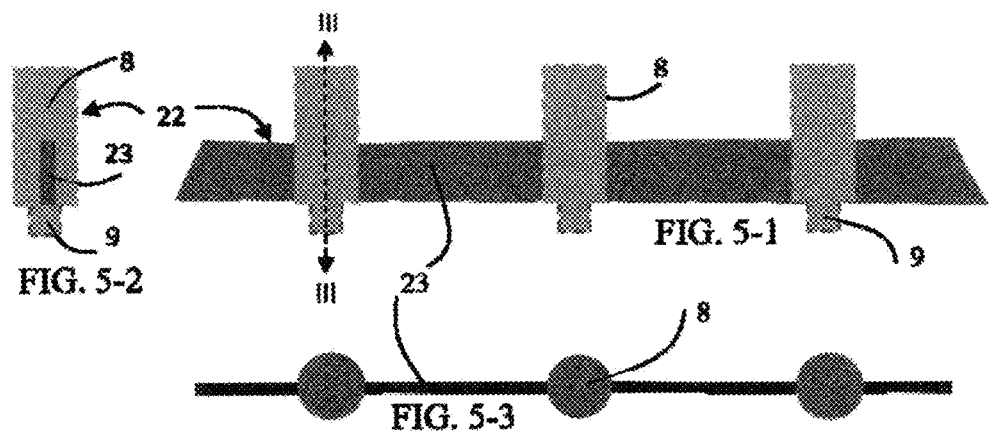
Figure 6:
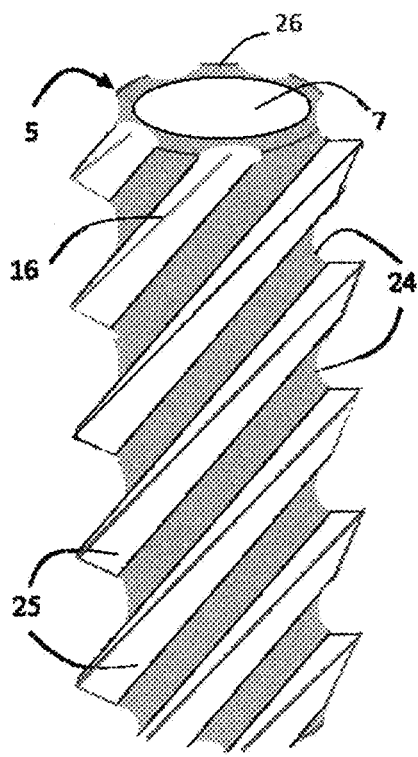
FIG. 6 is a schematic picture of spiral corrugated plastic tube.

1 PTSF, Plastic-Tube-Screen-Fill, 2 upper and lower ring-shaped hole perforated frame, 3 top and bottom ring-shaped hole perforated plate, 4 ring-shaped hole, 5 spiral corrugated tube, 6 PTSF pack, 7 inside hole of tube, 8 tube holder, 9 male push-fit tube connector, 10 size reduction gap, 11 spacing between outer circle of ring-shaped hole, 12 extending line of PTSF pack, 13 male attachment tab, 14 female attachment tab, 15 thickness of ring-shaped hole perforated frame, 16 peak of spiral corrugated bump, 17 image line of male push-fit tube holder, 18 cup-shaped hole perforated frame, 19 cup-shaped circular hole, 20 female push-fit band connector, 21 image line of cup-shaped hole, 22 tube-holder-frame, 23 male push-fit band connector, 24 corrugated groove, 25 corrugated bump, 26 corrugated surface, 27 perforated frame fabrication molder, 28 upper half molder of perforated frame fabrication molder, 29 lower half molder of perforated frame fabrication molder, 30 hollow cavity to create a body of perforated frame, 31 body of lower half molder of perforated frame fabrication molder, 32 cylindrical humps to create holes in the perforated frame, 33 top image line of cup shaped cylindrical hump, 34 band hump to create female push-fit band connector, 35 body of upper half molder of perforated frame fabrication molder, 36 location image line of cup-shaped cylindrical hole, 37 tube-holder-frame fabrication molder, 38 upper and lower half molders of the tube-holder-frame fabrication molder, 39 body of upper and lower half molders of tube-holder-frame fabrication molder, 40 extrusion blow molder, 41 hollow cavity of corrugated tube, 42 peak image line of corrugated bump, 43 body of left and right half molder of the extrusion blow molder, 44 extrusion head inserting hole, 45 corrugated bump angle, 46 corrugated thickness or tube thickness, 47 corrugated groove, 48 corrugated bump, 49 thickness of corrugated surface of corrugated tube, 50 length of one circular corrugated bump, 51 hot parison or pre-formed hot plastic tube, 52 air blow pin, 53 molten plastic, 54 extruder, 55 extrusion head, 56 air supplying hose, 57 hollow cavity of corrugated tube, 58 air pressure expanding parison, 59 plastics placed on the wall of hollow cavity, 60 molded product, 61 die-caster of molding fabrication of 3 perforated frames and 3 tube-holder-frames, 62 perforated frame fabrication molder, 63 tube-holder-frame fabrication molder, 64 cavity image line of tube-holder-frame, 65 cavity image line of perforated frame, 66 molten plastic distributor, 67 molten plastic inlet port, 68 molten plastic injector.

DETAILED DESCRIPTION OF THE PREFERRED EMBODIMENT

The plastic-rod-screen-fill (PRSF) invented by the present inventor has a disadvantage in employing large size rods (large diameter rod), since they require a large amount of materials for making solid rod. To complement such disadvantage of PRSF fabrication, the fabrication method of the plastic-tube-screen-fill (PTSF) using PVC tube is invented in the present invention. Any solid rod can be fabricated using a molten PVC injection machine like one step fabrication of PRSF, but plastic tube is made through molten plastic extruder. Hence, the fabrication of the PTSF can be accomplished by employing both injection and extrusion machines. Namely, the frame parts of PTSF are fabricated by the injection machine and the tubes fabricated by the extrusion machine, and then those parts are assembled to complete PTSF. The frame parts of PTSF include whole circular holes frame and tube holders. The whole circular holes frame is required, while PRSF has semi-circular holes frame, because PTSF needs a large intervals between adjacent tubes due to large diameter tubes and the tube holders are located in the center of the whole circular holes in the frame parts of PTSF. Therefore, the frame part of PTSF cannot be fabricated by one step machining as in the fabrication of PRSF. Actually, the frame of PTSF is fabricated by two separate machining, whole circular holes frame fabrication and tube holder fabrication, because one step injection machining is not possible for handling whole circular holes with tube holders in it. In other words, the whole circular holes frame and tubes holder are separately fabricated by the injection machining.

There are several factors for designing of PTSF. The designing factors for fabricating fill media like SSFs and PRSFs are extensively examined and determined in U.S. patents (application Ser. No. 13/666,327, U.S. Pat. No. 8,973,908 B2). Since the plastic tubes used in the present invention are similar plastic materials as used for the fabrications of SSF and PRSF, those results are applied to designing and fabrication of PTSFs without any significant modification. The factors for designing PTSF are PVC tube diameter, the number of PVC tubes in PTSF, diameter of holes on the frame of PTSF, and specific surface area of PTSF. Such factors are essential for the effective and economical designing of PTSF and described in the following descriptions.

<Determination of Tube Diameter Criterion for PTSF>

To determine an optimum diameter of tube, the marketing prices of plastic tube and rod fabricated using same material, PVC, are compared. Major factors determining the marketing prices of PTSF and PRSF are material cost and fill media mechanical fabrication cost excluding material cost. The fill media mechanical fabrication cost is fixed, not affected by tube or rod diameter, as an injection molding and assembling processes used for fabrication of PTSF and PRSF are not depending on the tube or rod diameter, but the material costs of tube and rod increase as their diameters increase. The fill media mechanical fabrication cost is determined from the fabrication procedure of fill media. The PTSF is fabricated through 3 fabrication steps: injection and extrusion molding process, assembling of perforated frame and tube-holder-frame to fabricate perforated tube holder frame, and assembling of tubes and perforated tube holder frames to fabricate PTSF. However, PRSF is fabricated by one step: PRSF is fabricated through one step of injection molding process. A mechanical fabrication cost of each step described above is assumed to be same because the assembling process can be automatically carried out like the injection molding process. Hence, the fill media mechanical fabrication cost of PTSF is three times higher than that of PRSF using an assumption of same fabrication cost rate applying to each step process of mechanical fabrication. Then, the total fabrication cost of PTSF or PRSF is sum of the fill media mechanical fabrication and material costs.

Figure 11:
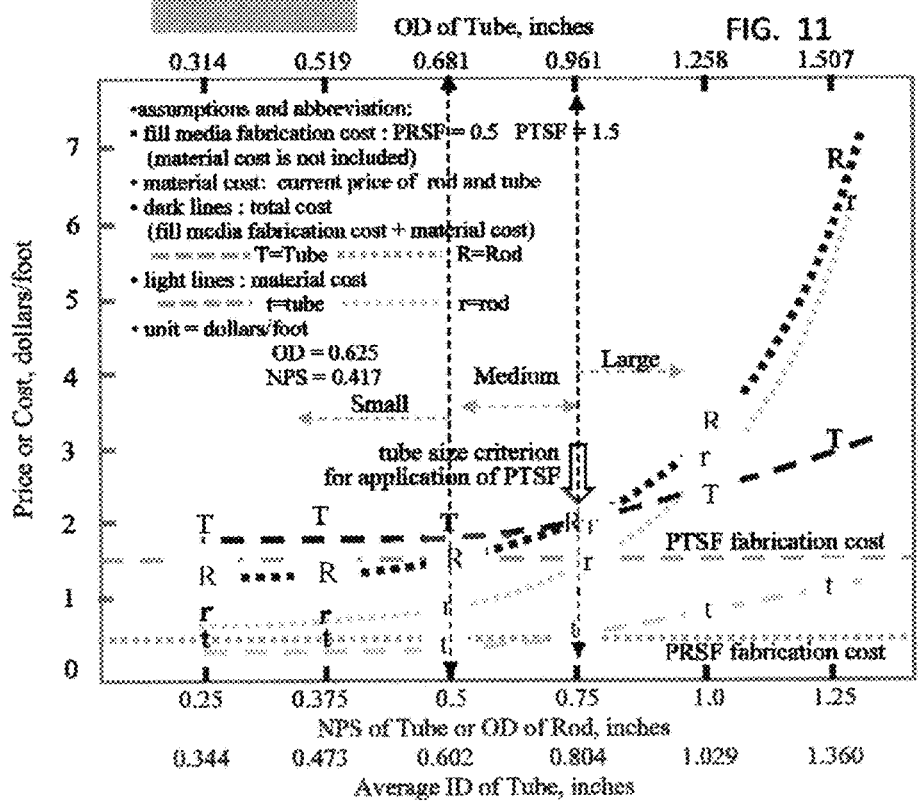
FIG. 11 shows a comparison of fabrication cost of PTSF and PRSF.

To observe a variation of total fabrication cost of PTSF and PRSF depending on tube or rod diameter, total fabrication costs of PTSF and PRSF are plotted against tube and rod diameters as shown in FIG. 11. FIG. 11 shows the variations of total fabrication cost and fill media mechanical fabrication cost of PTSF and PRSF, and material price as a function of tube or rod diameters. It is understood from FIG. 11 that the total fabrication costs of PRSF using rods larger than 0.75 inches in diameter rapidly increases, compared with those of PTSF, while using tubes and rods smaller than 0.75 inches in diameter, the total fabrication costs of PRSF is slightly getting lower than those of PTSF. From such trending of cost and price observation, the tube and rods are categorized into three groups of large, medium, and small size fill media as shown in FIG. 11. The large size group includes tubes and rods greater than 0.75 inches of tube ID and rod OD and the small size group contains tubes and rods less than 0.625 inches. The medium diameter tubes and rods between 0.625 and 0.75 inches are categorized into the medium size fill media group. The large and small size fill media are fabricated using tubes of greater than 0.961 (equivalent to 0.75 inches ID) inches in outer diameter and rods of less than 0.456 inches (equivalent to 0.625 inches OD) in inner diameters, respectively. Medium size fill media can be fabricated using both tubes and rods, since their material costs are not significantly different, but to save material, the fabrications of PTSFs using tubes between 0.625 (0.456 inch ID) and 0.961 inches OD (0.75 inch ID) are preferred. Eventually, the relatively small size apparatuses like evaporative chiller, evaporative cooler, air refresher, and small cooling tower prefer small diameter rod PRSFs using less than 0.456 inches OD of rod for fabrication of their fill media, while the fill media of large and medium size cooling towers are fabricated with large and medium diameter tube PTSFs using tubes of greater than 0.456 inches ID to minimize the amount of PVC. Therefore, the tube size criterion for PTSF is 0.456, the outer diameter of the minimum size tube applied to the fabrication of PTSF.

<Determination of Acceptable Tube Size in PTSF>

For the fabrication of the small diameter tube PTSF (smaller than 0.75 inches in inner diameter), the number of tubes used in PTSF is determined using same method as used for determination of optimum number of rods in PRSF, which is described in US patent U.S. Pat. No. 8,973,908 B2. However, the number of large diameter tubes (larger than 0.75 inches in inside diameter) used in PTSF is determined using current design information of a fill media used in the cooling tower. Standard fill media pack size of commercial plastic film fill media is 12(W)×24(D)×48(H) inches, which has a specific surface area of 40 ft2/ft3 with sheet spacing of 1.49 inches (38 mm) to 51 ft2/ft3 with sheet spacing of 0.75 inches (19 mm) (referred to Cooling Tower Depot, Cross Flow Fill With Louver or Drift Eliminator and Star Cooling Towers, Counterflow and Crossflow Film Fills). Hence, the standard size of the commercial fill media pack can be used to make the size of standard PTSF pack same to directly compared with each other. To determine the number of tubes in the standard PTSF pack of 12(W)×24(D)×48(H), tube spacing is determined. The tube spacing is interval between the surfaces of adjacent tubes and is equal to summation of a thickness of ring-shaped holes around the tube and ring-shaped hole spacing between outer circle of adjacent ring-shaped holes. Therefore, the interval between adjacent tubes (distance between centers of tubes) is equal to the summation of tube diameter, twice of thickness of ring-shaped hole, and ring-shaped hole spacing. Namely, Interval=ring-shaped hole Diameter+ring-shaped hole Spacing. As in the previous U.S. patent (U.S. Pat. No. 8,973,908 B2), the outer diameter of ring-shaped hole is made to be 1.412 times outer diameter of tube and the ring-shaped hole spacing is kept constant spacing of 0.394 inches (10 mm) which is applied to every different tube diameters. Computation formula of interval is driven as follows. Tube Interval between adjacent tubes in PTSF=1.412×Tube OD+0.394. See the determination of the optimum spacing between adjacent rods in U.S. patent, U.S. Pat. No. 8,973,908 B2. Applying this optimum spacing determination method to the present invention, the optimum numbers of tubes of 0.1 to 1.75 inches in outer diameter required for fabrication of PTSFs pack of 12(D)×24(W)×48 (H) inches are determined and tabulated in Table 2. The optimum numbers of tubes for fabrication PTSF are indicated as bolt numbers in the column of Table 2. The tubes are located in a staggered position in PTSF pack. Up to the tubes of 1.2 inches in outer diameter, the staggered configuration of tubes is achieved with the ring-shaped hole spacing of 0.394 inches. However, for the tubes of greater than or equal to 1.5 inches in diameter, a little larger ring-shaped hole spacing, 0.572 inches, is necessary to fabricate a complete frame of PTSF shown in FIG. 3-3. If not, the thickness of the perforated frame becomes narrow to damage the ring-shaped hole. Table 2 shows that the surface areas of PTSF packs of large diameter tubes greater than or equal to 1.5 inches in outer diameter are small, compared with those of other tubes of less than 1.5 inches. Such an observation indicates that the small surface area of fill media leads to its low operation efficiency. Therefore, the operational efficiencies of the large diameter tube PTSF packs using greater

TABLE 2

Variation of number of tubes in PTSF and specific surface area of PTSFs pack depending on tube outer diameter.

Specification of PTSF
Dimension of PTSF: 24 (W) × 48 (H) inches
Dimension of PTSFs pack: 12 (D) × 24 (W) × 48 (H) inches

| Specification of PVC film fill | Tube OD (in) | # of tubes In Pack | # of PTSFs In pack | # of tubes In PTSF | Thick of PTSF (in) | Interval of tubes In PTSF (C to C) (in) | Thick of ring holes (in) | Interval of ring holes (OD to OD) (in) | Surface area of pack (ft2) | Specific surface area of pack (ft2/ft3) |
|---|---|---|---|---|---|---|---|---|---|---|
| Dimension | 1.75 | 32 | 4 | 8 | 2.622 | 3.043 | 0.361 | 0.572 | 59 | 7 |
| 12 (D) × | 1.5 | 45 | 5 | 9 | 2.318 | 2.691 | 0.309 | 0.572 | 71 | 9 |
| 24 (W) × | 1.2 | 77 | 7 | 11 | 1.799 | 2.088 | 0.247 | 0.394 | 97 | 12 |
| 48 (H) | 1.0 | 104 | 8 | 13 | 1.556 | 1.806 | 0.206 | 0.394 | 109 | 14 |
| (inches) | 0.78 | 149 | 9.3 | 16 | 1.289 | 1.496(38) | 0.1607 | 0.394 | 122 | 15 |
| Specific | 0.75 | 158 | 9.6 | 17 | 1.252 | 1.453 | 0.1545 | 0.394 | 124 | 16 |
| Surface | 0.625 | 207 | 11 | 19 | 1.100 | 1.277 | 0.1288 | 0.394 | 138 | 17 |
| Area | 0.5 | 276 | 12.66 | 21.82 | 0.948 | 1.100 | 0.103 | 0.394 | 144 | 18 |
| 40-69 | 0.456 | 308 | 13.4 | 23 | 0.894 | 1.038 | 0.094 | 0.394 | 147 | 18.4 |
| (ft2/ft3) | 0.375 | 390 | 15 | 26 | 0.796 | 0.924 | 0.0773 | 0.394 | 153 | 19 |
| PVC film | 0.307 | 493 | 17 | 29 | 0.7125 | 0.827(21) | 0.0632 | 0.394 | 158 | 19.75 |
| gauge = | 0.251 | 608 | 19 | 32 | 0.6444 | 0.748(19) | 0.0517 | 0.394 | 160 | 20 |
| 10-15 mils | 0.25 | 608 | 19 | 32 | 0.6435 | 0.747 | 0.0515 | 0.394 | 159 | 19.88 |
| Weight = | 0.125 | 1008 | 24 | 42 | 0.4914 | 0.571 | 0.0578 | 0.394 | 132 | 16 |

TABLE 2-continued

Variation of number of tubes in PTSF and specific surface
area of PTSFs pack depending on tube outer diameter.

Specification of PTSF
Dimension of PTSF: 24 (W) × 48 (H) inches
Dimension of PTSFs pack: 12 (D) × 24 (W) × 48 (H) inches

| Specification of PVC film fill | Tube OD (in) | # of tubes In Pack | # of PTSFs In pack | # of tubes In PTSF | Thick of PTSF (in) | Interval of tubes In PTSF (C to C) (in) | Thick of ring holes (in) | Interval of ring holes (OD to OD) (in) | Surface area of pack (ft2) | Specific surface area of pack (ft2/ft3) |
|---|---|---|---|---|---|---|---|---|---|---|
| 2.3-2.9 lbs/ft3 | 0.1 | 1171 | 26.02 | 45 | 0.4611 | 0.5352 | 0.0206 | 0.394 | 123 | 15.4 |

Notes:
multiplication factor = 1.412;
OD = outside diameter;
C = center of tube.

than or equal to 1.5 inches are not acceptable for their commercialization. Eventually, the fill media using tubes should be fabricated with those of less than or equal to 1.2 inches in outer diameter which is a maximum diameter of tube applicable to the fabrication of PTSF. Considering the size criterion and maximum diameter of tube, it is concluded that the acceptable tube diameters used for fabrication of PTSF are in the range of 0.456 to 1.2 inches in outer diameter of tube.

<Number of Tubes Required for Economical Fabrication of PTSF>

Dimension of standard PTSF is determined using a small size commercial standard PVC film fills pack. The small standard PVC film fills pack has a dimension of 12(D)×24 (W)×48(H) inches and the numbers of PVC film fills in it are mainly 15, 16, and 26 sheets/ft with sheet spacing of 0.827, 0.748, and 0.472 inches, respectively. See Star Cooling Towers, Counterflow and Crossflow Film Fills in references for a detailed description of the standard PVC film fills pack. To determine the dimension of standard PTSF, the dimension of standard PVC film fills pack and the sheet spacing of the PVC film fills assembled in the pack. From the dimension of 12(D)×24(W)×48(H) inches, the width×height of PTSF can be determined to be 24×48 inches of rectangular PTSF as shown in FIGS. 1 and 3-1. The intervals between tubes in the PTSF is distance between the center of the adjacent tubes and is equalized with the sheet spacing of PVC film fills in the PVC film fills pack. Hence, the tube intervals in the PTSF are 0.827, 0.748, and 0.472 inches from center to center of the adjacent tubes. Using these tube intervals and width of the PTSF, the number of tubes in the PTSF is determined to be 29 (e.g. 24 inches/0.827 inches=29), 32, and 51 for the tube intervals of 0.827, 0.748, and 0.472 inches, respectively, which are tabulated as bolt numbers in Table 2. The thickness of PTSF can be determined by equalizing with the tube interval in the PTSF, because adjacent tubes are lined up on the depth of PTSF pack when two PTSFs are jointed together for assembling of PTSFs as described in the section of <Designing of PTSF>. By doing so, for tubes in each PTSF to be positioned on the tube interval between adjacent tubes in PTSF, the thickness of the PTSF is fabricated to be equal with the tube interval in PTSF. Then, among the tube intervals created by joining two PTSFs of same thickness with tube interval in the PTSF, the shortest interval is equal with the thickness of PTSF, where the tubes are located on the vertex of square or isosceles triangle with its height and base are equal with thickness of PTSF. To make all of tube intervals created by joining together of PTSFs equal, they are positioned on the vertex of equilateral triangle, since all three sides of the equilateral triangle are congruent. To do this, the height of the equilateral triangle whose sides are congruent with the tube interval in PTSF is computed using a computation formula of "Thickness of PTSF=0.8615×Tube Interval." This formula shows that the thickness of PTSF is the reduced length of tube interval in PTSF by 13.85%, which means an increasing of the number of tubes in PTSF. In turn, the surface area of standard PTSF pack is increased by that much ratio. Using the above formulas (indicated as bolt letters and numbers), the number of tubes in a single unit of PTSF, number of PTSFs and total number of tubes in PTSF pack, and specific surface area of PTSF pack are determined depending on the tube outer diameters and the results are tabulated in Table 2. The number of tubes able to economically fabricate PTSFs is in the range of 77 to 308 corresponding to the tube diameters of 1.2 down to 0.456 inches in outer diameter.

<Specific Surface Area of PTSF Pack>

The specific surface areas of PTSF pack for tubes of 0.1 to 1.75 inches in outer diameter are given as bolt numbers in the last column of Table 2. As described above, the economic fabrication of PTSF needs tubes of 0.456 to 1.2 inches in outer diameter. Their specific surface areas are in the range of 12 to 18.4 ft$^2$/ft$^3$ whose corresponding outer diameters are 1.2 down to 0.456 inches. To evaluate whether the computed specific surface areas are acceptable or not, the results of the cooling tower benchmarking experiment carried out by the inventor of the present invention are employed. See U.S. Pat. No. 8,973,908 B2 for detailed description of benchmarking experiment. The benchmarking experiment compared the cooling capability of the String Screen Fills pack invented by the present inventor with that of the commercial PVC film fills pack. Their specific surface areas were 41 ft$^2$/ft$^3$ for PVC film fills Pack and 14 ft$^2$/ft$^3$ for String Screen Fills pack. The cooling efficiencies of the PVC film fills pack and String Screen Fills pack were 13 and 16%, which means the String Screen Fills pack has a higher cooling efficiency by 20%. Therefore, it can be understood that the cooling efficiencies of all PTSFs to be fabricated using the specifications of PTSFs given in Table 2 are higher than those of commercial PVC film fills, since the specific surface area, 14 ft$^2$/ft$^3$, of the String Screen Fills pack fabricated using strings of 0.098 inch in diameter is close to 15.4 ft$^2$/ft$^3$ of PTSF pack using 0.1 inch tubes shown in Table 2.

<Optimum Large Surface Area of SCT>

Figure 12:
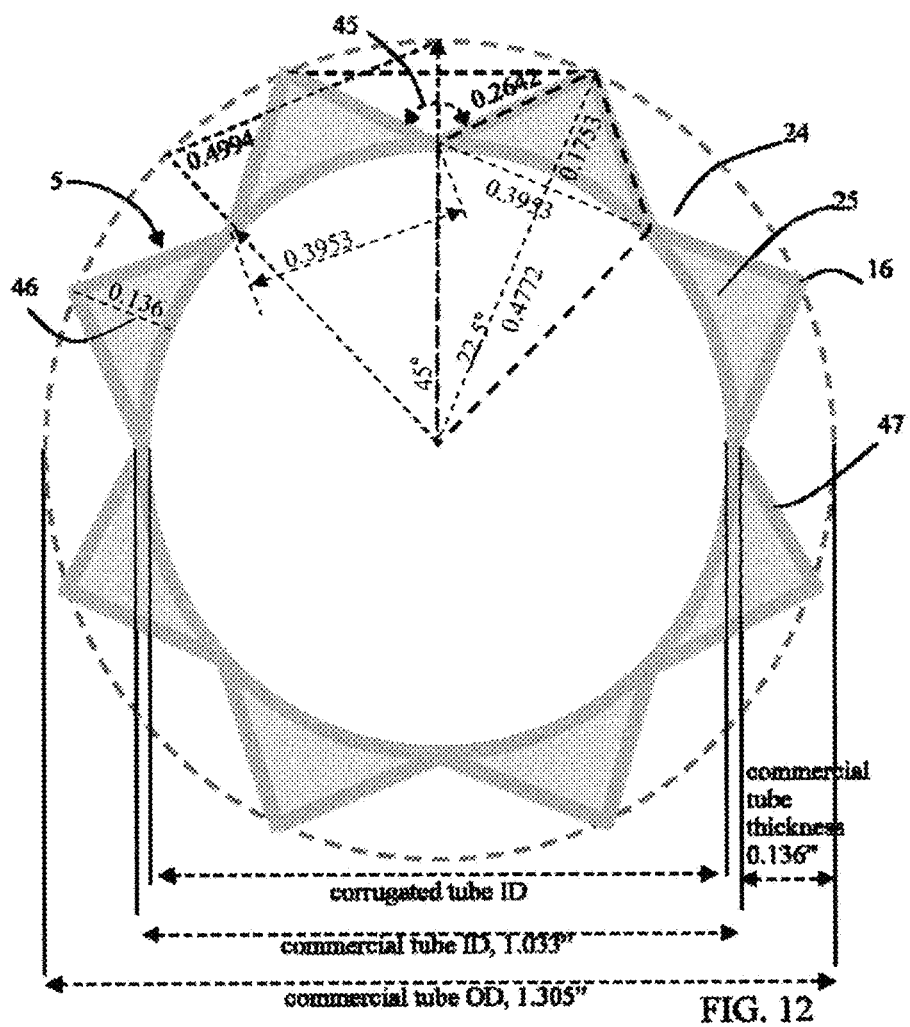
FIG. 12 illustrates a rough schematic drawing of 8 wavy corrugated tube based on commercial NPS 1 inch PVC tube.
Figure 13:
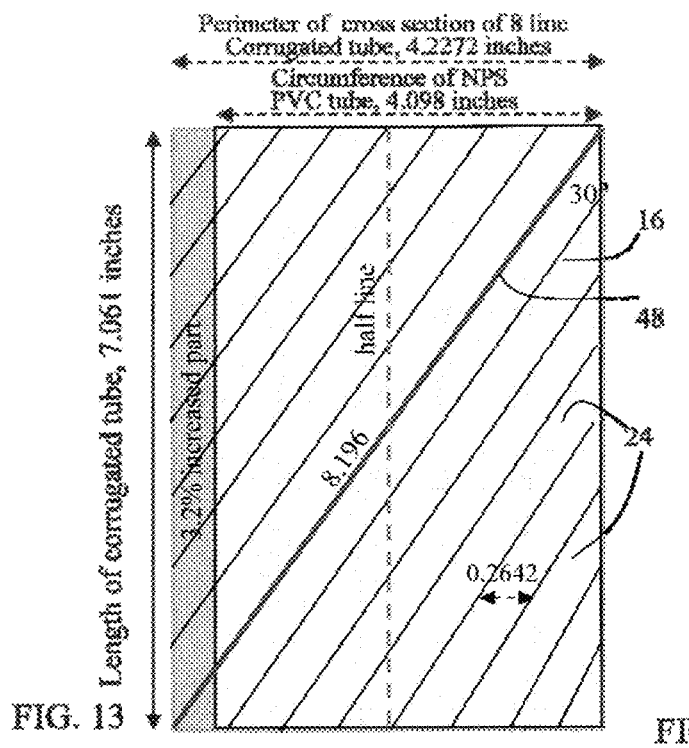
FIG. 13 shows a picture of 8 wavy corrugated crest lines slanted by 30 degree shown on rectangular surface of circumference of NSP 1" PVC tube×length of corrugated tube with one circular length of corrugated crest line as diagonal.
Figure 14:
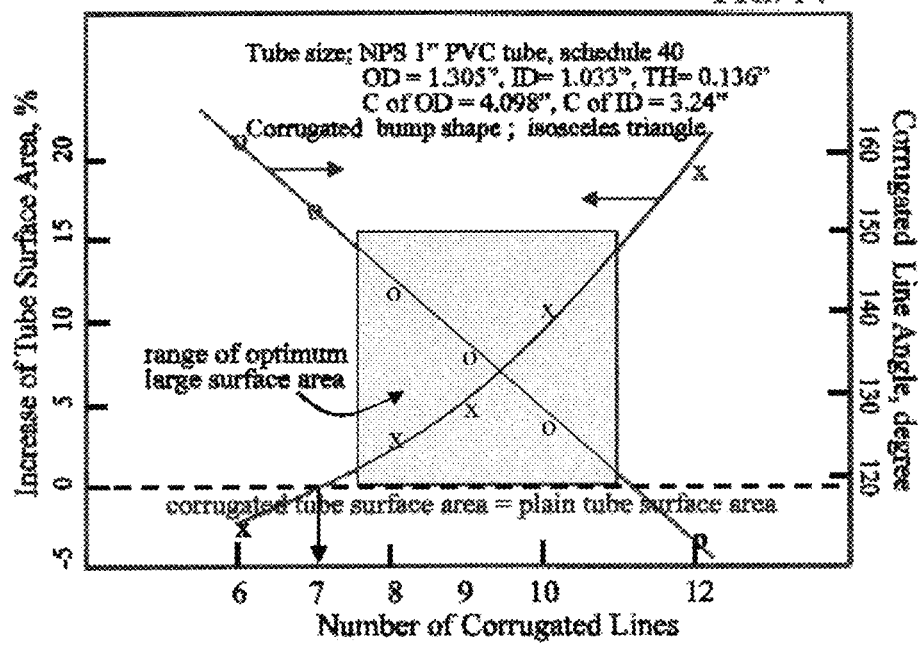
FIG. 14 shows a variation of increase of surface area and slant angles of corrugated crest lines on NPS 1" PVC tube as a function of number of corrugated crest lines.

The larger the surface area of the corrugated tubes is, the better cooling efficiency of the cooling media fabricated using the corrugated tubes with large surface area can be expected. However, there is a limit for the determination of the large surface area of the corrugated tube, because the corrugated bump angle gets smaller than an acceptable small angle. Such small angles cannot hold water in the corrugated grooves and allow water flow over the corrugated bumps instead of flowing down along the corrugated grooves. To determine the acceptable surface area and corrugated bump angle, an assumption is required as the shapes of spiral corrugated bumps are isosceles triangles as shown in FIG. 12 for an easy and possible computation of the surface area of spiral corrugated bumps on tube. Under such an assumption, the cross section of 8 bump corrugated tube can be divided into 8 of diamond shapes. One of them is highlighted with dark solid lines as shown in FIG. 12. The diamond shape is formed by combining short leg and long leg isosceles triangles, which has a long diagonal of 0.6525 inches and short diagonal of 0.3953 inches, respectively. The short legs of the short leg isosceles triangle are formed in the thickness of PVC tube and their lengths are 0.2642 inches. The perimeter of cross section of eight bump corrugated tube is covered with 16 short legs and therefore the perimeter of the cross section is 4.2272 inches which can be compared with the outer circumference, 4.098 inches, of NPS 1" PVC tube. To compare them, the surface of the plain NPS 1" PVC tube and 8 bump corrugated tube up to one circular length of corrugated line are drawn in one figure as shown in FIG. 13. FIG. 13 shows the flat surface of 8 corrugated bumps slanted by 30 degree which is larger than the original surface of plain tube. The dark rectangular area shown in FIG. 13 is the outer surface of the plain tube. From their comparison, it is understood that the surface area of the 8 bump corrugated tube increases by 3.2%. The corrugated bump angle can be computed from dark highlighted diamond shape rhombus whose vertex angle, small legs, long diagonal, and short diagonal are respectively 45 degree, 0.2642, 0.6525 (=0.4772+0.1753), and 0.3953 inches. With helping of the vertex angle of 45 degree, leg length of 0.2642 inches, and diagonal of 0.3953 inches, the corrugated bump angle can be computed to be 142 degree. The corrugated bump angle of 142 degree is large enough for water to be held and flow down in the grooves of the corrugated lines. Therefore, the 8 bump corrugated NPS 1" PVC tube satisfies the condition of the optimum large surface area, as its surface area and corrugated bump angle are respectively large and wide and deep enough for water to be held in the grooves. Likewise, the surface areas and corrugated bump angles of other number of corrugated bumps on the surface of NPS 1" PVC tube are computed and plotted as function of number of corrugated bumps as shown in FIG. 14, which shows that the surface area of the corrugated tube increases as the number of corrugated bumps does, while the corrugated bump angle decreases. Observing the plots of the corrugated bump angles and surface areas of the corrugated tube varying due to number of corrugated bumps, the corrugated bump angles and surface areas satisfying the conditions of the optimum large surface area are in the range of a dark square shown in FIG. 14. Namely, the numbers of the corrugated bumps economically fabricated on the surface of NPS 1" PVC tube are 7 to 11 bumps, whose surface area can be increased by 0 to 15%, respectively. Eventually, combining the effects of corrugated bumps (0 to 15%), slant angle of corrugated bumps (0 to 5%), and surface area of the PTSF pack (10 to 15%), the cooling effect of the spiral corrugated tube PTSF (SCTSF) is higher than that of the PVC film fill by 10 to 35%.

<Comparison of PVC Amount Required for Fabrication of Current PVC Fill and SCTSF>

The comparison of PVC amount required for fabrication of current PVC fills and SCTSF fills pack is necessary to be performed under the same conditions. Namely, a basic volume of fills pack used in their comparison is one cubic feet. To do so, the physical specification, surface area, dry weight of PVC per cubic feet, PVC film thickness (film gauge), and density of PVC film of current standard PVC fills pack are necessary for driving of PVC amount required for fabrication of SCTSF fills pack under the same physical conditions as used in PVC fills pack. They are respectively 48 ft$^2$/ft$^3$, 2.6 lbs/ft$^3$, and 15 mils except for density, which are obtained from reference of starcoolingtowers.com. The density of 15 mils PVC film used on this PVC film pack is estimated to be 43 lbs/ft$^3$ (=2.6 lbs/(48 ft$^2$×0.015 in)). Using this information concerning the basic volume in one cubic feet of fills pack, the weight of SCTSF fills pack in one cubic feet is calculated as follows. First, the surface area of SCTSF fills pack is calculated like the surface area of PTSF fills pack×1.15 (maximum) or 1.10 (minimum) since the surface area of SCTSF increases by 10 to 15% as described in the section of Optimum Large Surface Area of SCTSF. The surface areas of PTSF pack with tubes in various diameters are given in Table 2. The diameters of tubes applicable to economical fabrication of PTSFs are in the range of 0.456 to 1.2 inches in outer diameter, whose corresponding surface areas are 18.4 and 12 ft$^2$/ft$^3$. Hence, the maximum optimizing surface areas of SCTSF pack with small tube of 0.456 inches in diameter and large tube of 1.2 inches are 21.16 ft$^2$(=18.4×1.15) and 13.8 ft$^2$ in a volume of one cubic feet. Then, their corresponding weights of CTSF packs are 1.137 lbs (21.16 ft$^2$×0.015 in×ft/12 in×43 lbs/ft$^3$) and 0.742 lbs (=13.8 ft$^2$×0.015 in×ft/12 in×43 lbs/ft$^3$) per volume of one cubic feet. Comparing the weights, 0.742 to 1.137 lbs/ft$^3$, of SCTSF pack with 2.3 to 2.9 lbs/ft$^3$ of current standard PVC pack, the fabrication of SCTSF pack saves 61 to 68% of the amount of PVC required for fabrication of current PVC fills pack.

<Gas and Liquid Contacting Process of PTSF Pack>

Figures 1, 17:
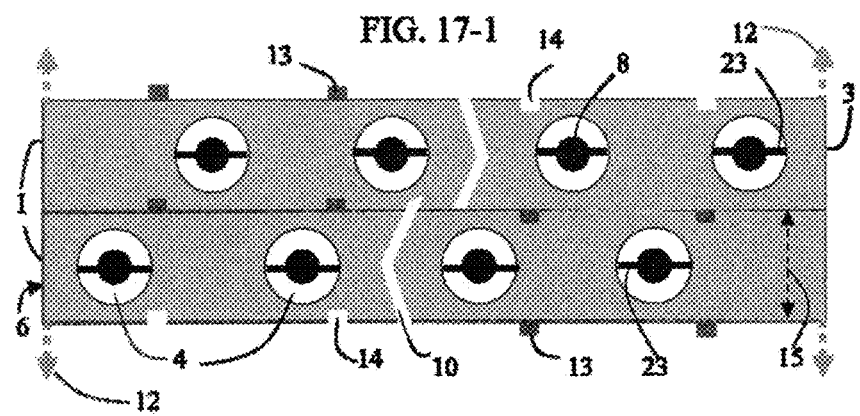
Figures 2, 17:
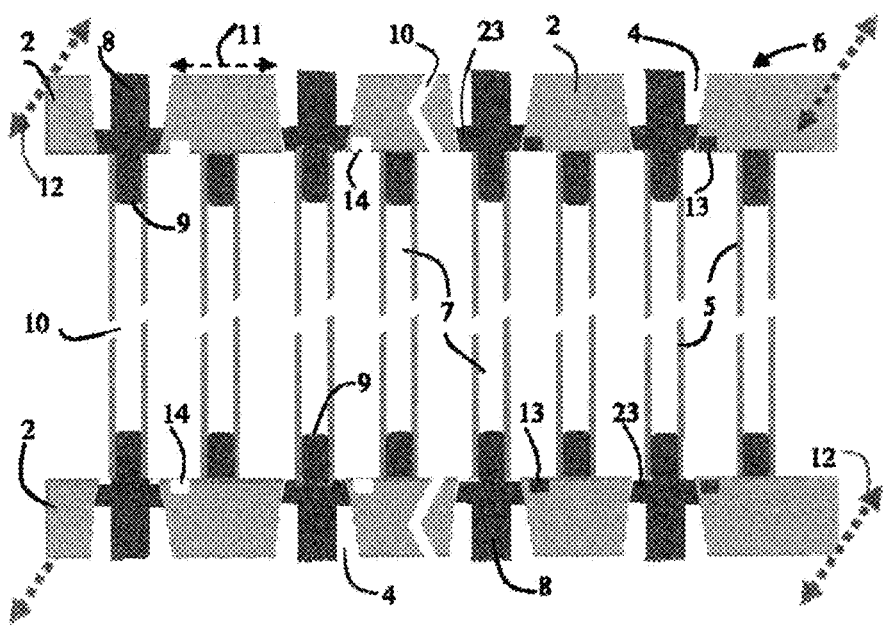

In the operation of the PTSF packs in the gas and liquid contactors, liquid supplied on the ring-shaped hole perforated plate 3 of the PTSF pack 6 distributes over the ring-shaped hole perforated plate 3 shown in FIGS. 2 and 17-1 without free falling down into the PTSF pack 6, unlikely from the patented gas and liquid contactors allowing a large amount of liquid to be free falling down into the gas and liquid contactor, and is simultaneously imbibed into through ring-shaped holes 4 by surface tension of the tube holders 8 placed at the center of the ring-shaped holes 4 and then flows downwards by gravity force along the spiral corrugated grooves 24 on the corrugated surfaces 26 of the tubes 5. While the liquid flows downwards on the spiral corrugated grooves 24 on the corrugated surfaces 26 of the tubes 5, gas is transversely traveling through the tubes 5 by forced draft blowing in a direction of air flow into PTSF pack from outside of the PTSF pack as shown in FIG. 2. Hence, the liquid flowing downwards on the corrugated surface 26 of tubes 5 vertically standing up-right can continuously contact with new gas (against liquid) coming down all through the length of tubes 5, as the gas contacted once with liquid instantly passed away from the liquid, while the gas horizontally flowing across the width of the PTSF pack 6 also can contact with new liquid (against gas) because the gas can encounter new tubes 5 positioned in staggered arrangement as shown in FIGS. 17-1 and 17-2. Likewise, the liquid and gas residing within the PTSF pack 6 can contact new gas and new liquid, respectively, which contacting process of gas and liquid occurs on the surfaces 26 of entire tubes 5, until the gas and liquid are discharged out of the PTSF pack 2. Since the liquid and gas can contact respectively new gas and liquid, the cooling or absorption efficiency of the PTSF pack 6 can be maximized.

<Fabrication of Molder>

The fabrication of the PTSF 1 needs three molders: cup-shaped hole perforated frame 27, tube-holder-frame 37, and spiral corrugated tube fabrication molders 40. The spiral corrugated tube 5 requires one sort of tube, but the perforated frame 27 and tube-holder-frame 37 require respectively two kinds of frames and holders, as the tubes are arranged in staggered position. To achieve this requirement with the employment of one molder for each of them, the molder should be designed to fabricate the perforated frame 18 or tube-holder-frame 22 able to be used in two ways. To do these, the perforated frame fabrication molder 27 is fabricated for the first circular hole 19 from the left edge of the perforated frame 18 to be located at the half distance of the distance between the right edge and the first circular hole 19 on the right side of frame as shown in FIGS. 8-1, 8-3, and 8-5. And also the tube-holder-frame fabrication molder 37 is fabricated in the same way as the perforated frame fabrication molder 27 as shown in FIGS. 9-1 and 9-3. However, the attachment tags 13, 14 on the both end sides of the perforated frame 18 should be positioned on the same distance from both edges of the perforated frame 18 as shown in FIG. 8-1 for the overlapping of male and female attachment tags 13, 14 to be aligned and joined together when one of two perforated frames 18 is horizontally rotated by 180 degree. FIG. 8-1 shows the schematic side view of the perforated frame fabrication molder 27 produced by overlapping a lower half molder 29 shown in FIG. 8-3 and a upper half molder 28 shown in FIG. 8-5. The light part in the lower half molder 29 shown in FIG. 8-3 is a hollow cavity 30 to create a body of perforated frame 18 and dark and light tags create respectively female and male attachment tags 13, 14. In the upper half molder 28 shown in FIG. 8-5, the light part is a hollow cavity 30 to create a body of perforated frame 18 and dark circles on the center line of the hollow cavity 30 are cup-shaped cylindrical humps 32 to create cup-shaped cylindrical holes 19 in the perforated frame 18. The dark straight bar 34 connected all dark circles 32 in the upper half molder 28 are straight bar hump 34 creating female push-it connector 23 as shown in FIG. 5-3. FIGS. 8-2, 8-4, and 8-6 show cross sectional views of cross section IV-IV, V-V, and VI-VI on the perforated frame fabrication molder 27, lower half molder 29, and upper half molder 28, respectively. To firmly join together PTSFs 1 when the PTSF pack 6 is assembled, 2 male and 2 female attachment tags 13, 14 are properly carved respectively on one side near to left and right edge of the lower half molder 29 of the perforated frame fabrication molder 27 as shown in FIG. 8-3, while 2 female and 2 male attachment tags 13, 14 are properly carved on the other side near to the edge of the lower half molder 29. By doing so, the male attachment tabs 13 can join firmly together with female attachment tabs 14 on the same location by pressing them, when they are assembled together with horizontal rotation of one of two frames by 180 degree.

The tube-holder-frame 22 consists of several tube holders 8 and male push-fit band holders 23. The tube holders 8 are made of a round solid rod as an upper part of the tube holders 8 and push-fit tube connector 9 as a lower part and they are connected with male push-fit band connector 23 to be formed in one structure as illustrated in FIGS. 5-1, 5-2. and 5-3. This tube-holder-frame 22 in one structure is carved in two half molders 37, 38 as shown in FIGS. 9-1, 9-2, and 9-3. FIG. 9-1 shows the side view of the tube-holder-frame fabrication molder 27 joined upper and lower half molders of molder 38 and FIG. 9-2 shows the cross sectional view of cross section VII-VII shown in FIG. 9-1. The light parts 23 in the center of the molder 27 shown in FIG. 9-1 are hollow cavities 23 creating the body of the tube-holder-frame 27 and the dark parts are a body of molder. FIG. 9-3 shows the top view of upper and lower half molders which are same.

Figures 1, 10:
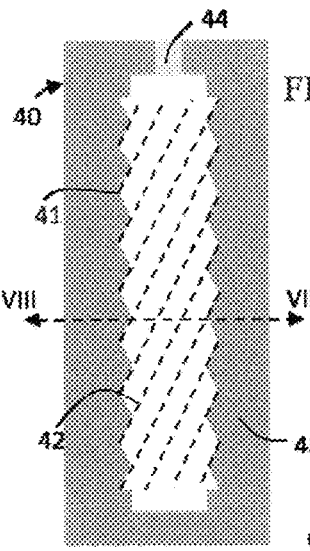
Figures 2, 10:
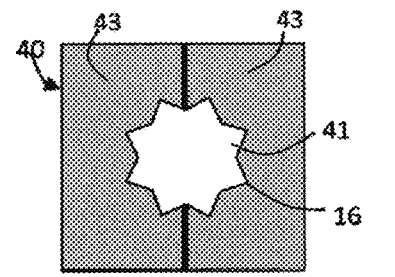

The spiral corrugated tube 5 are fabricated using two half molders 40 carved the half shape of spiral corrugated tube 5 as shown in FIGS. 10-1 and 10-2. Two half molders 40, split half molder 1 and 2, are same in molding configuration and so they are carved in same configuration. FIG. 10-1 illustrates a schematic picture of top view of one split half molder 40. Dark part is a body of split half molder 1 and 2 43 and white part 41 is a carved half part of spiral corrugated tube 5. The dot lines 42 are images of the peak of corrugated bumps 48 slanted by 30 degree to the length of the tube. At the center of the top of split half molder 40 is a half cylindrical hole 44 to provide a insert hole inserting hot plastic injector and air blow pin 52 of extrusion head 55, through which a plastic hot resin 53 is transported and pressure air 58 is blown into the blow molder 40. Overlapping the two half molders 40 together, the corrugated grooves 47 and bumps 48 are exactly put in a straight line without any discontinuity for water to flow along the corrugated grooves 47. FIG. 10-2 shows a cross sectional view of cross section VIII-VIII of the spiral corrugated tube fabrication molder whose schematic picture of overlapping split mold 1 and 2 is as shown in FIG. 10-1, with hollow cavity 41 of the 8 bumps wavy corrugated tube 5 created, when the split half molder 1 and 2 43 are jointed together.

<Fabrication of SCTSF Using Molders>

Figure 15:
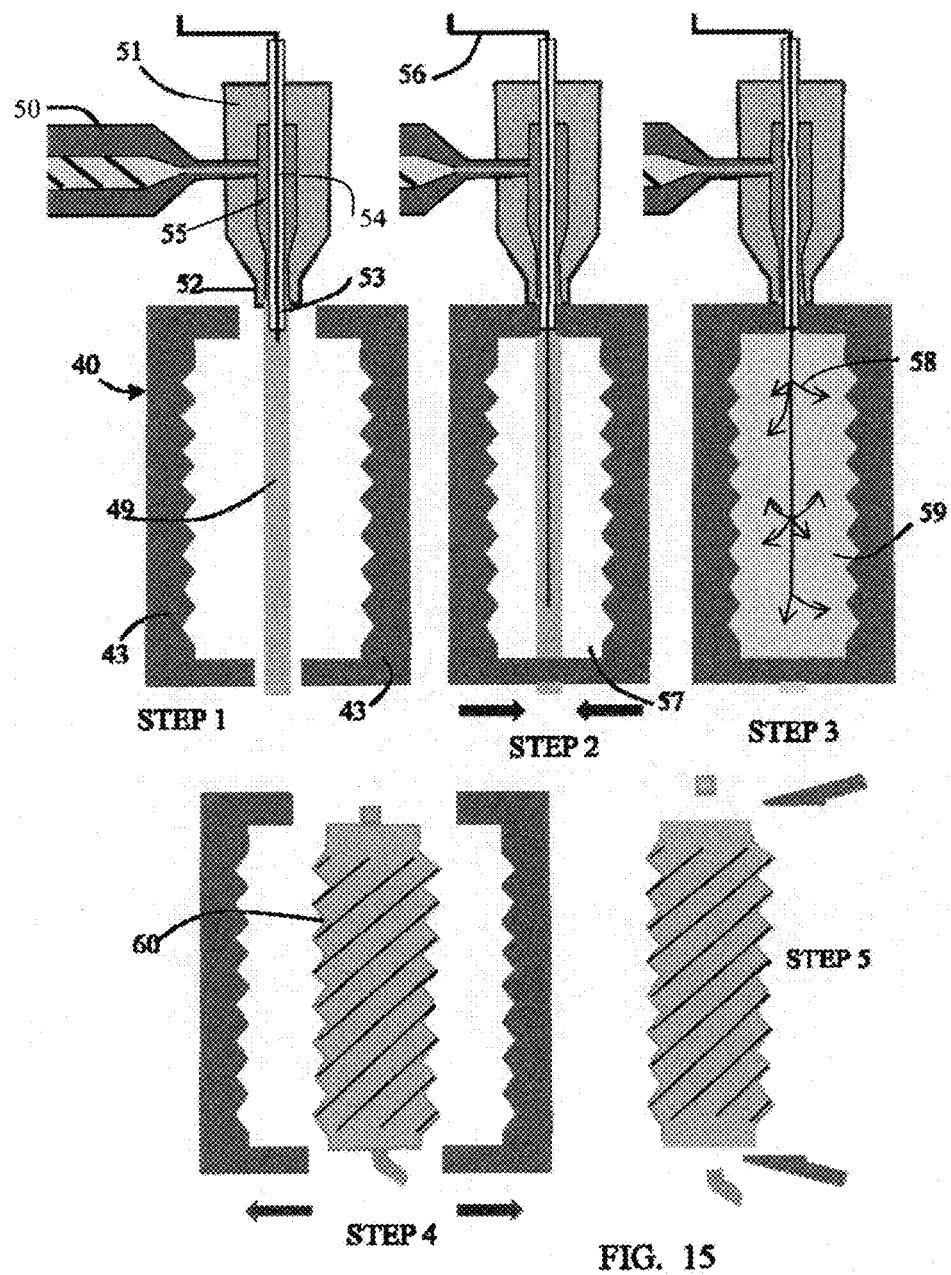
FIG. 15 illustrates the fabrication procedure of spiral wavy corrugated tube using extrusion blow molding process.

The fabrication of SCTSF 1 is accomplished by sequential fabrication activities of spiral corrugated bump tubes 5, perforated frames 18, tube-holder-frames 23, and their assembling into SCTSF 1. The spiral corrugated bump tubes 26 are fabricated through the extrusion blow molding process shown in FIG. 15 using the spiral corrugated tube molders 40 shown in FIGS. 10-1 and 10-2. The extrusion blow molding process is an extended process added to the outlet portion of the molten plastics extruded by the extrusion machine. The extended process is an expansion process of parison (pre-formed tube), which is an air blow molding like a balloon. Namely, the pre-formed plastic resin hot tube extruding from the extrusion machine is placed within a split molder, with a hollow cavity of a final end product, shown in FIGS. 10-1 and 10-2, and the molder sides are clamped together, pinching and sealing the pre-formed tube. Then, air is blown into the tube, which expands the hot resin wall of the pre-formed tube into the shape of the cavity and the mold is cooled with water solidifying the resin into the shape of the end product. Once cooled, the part is ejected from the mold and trimmed. Such an extrusion blow molding process applying to fabrication of the spiral corrugated bump tube 5 is shown in FIG. 15, which shows 5 stages of fabrication procedure of spiral corrugated tube 5 using the spiral corrugated tube fabrication molder 40 shown in FIGS. 10-1 and 10-2. In the first stage, STEP 1 shown in FIG. 15, the spiral corrugated tube molder 40 is set to the extrusion head of extruder 54 and parison or pre-formed plastic tube 51 is placed within the molder 40. In STEP 2, the two half molders 43 are closed and clamped together, sealing the pre-formed tube 51 and then the air blow pin 52 is inserted into the parison 51. In STEP 3, the inflation of the parison 51 is started by pressure of air blown 58 into the pre-formed tube 51 through the long air blow pin 52. The air pressure expands the plastic wall of the pre-formed tube 51 to the wall of the hollow cavity 57 of the blow molder 40 as shown in STEP 3 in FIG. 15, so that plastic film is placed on the wall of the blow molder. Eventually, thin plastic spiral corrugated tube 60 is formed on the wall of blow molder 40, whose thickness is like dark line 49 plastic wall of corrugated tube 5 shown in FIG. 12. After cooled down, the thin plastic spiral corrugated tube 60 is ejected from the blow molder 40 in STEP 4. The final product 60 needs to trim scrap remained and to cut out unnecessary part on both ends of the final product tube 60. These trimming processes are performed in the final stage, STEP 5, of blow molding fabrication process of the spiral corrugated tube 5.

Figure 16:
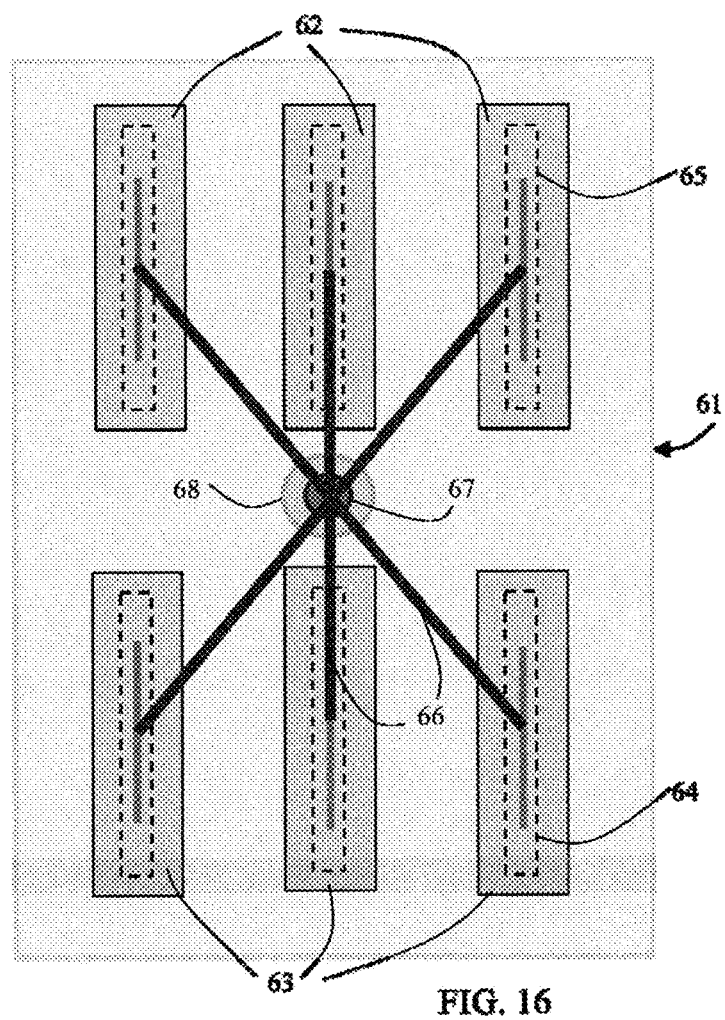
FIG. 16 shows a schematic picture of die-caster of molding fabrication of 3 perforated frames and 3 tube-holder-frames at one injection of molten plastic by extrusion machine.

The molding fabrications of the perforated frame 18 and tube-holder-frame 22 are accomplished by respectively injecting of molten plastic into the perforated frame and tube-holder-frame fabrication molders 27, 37 shown in FIGS. 8-1 and 9-1 mounted on an injection machine. To fabricate them at one shot of the injection machine, the perforated frame and tube-holder-frame fabrication molders 27, 37 must be installed in one large die-caster 61, which can be inserted into a large injection machine. The determination of the machine size of injection machine is described in the U.S. patent application Ser. No. 13/888,327. Since the perforated and tube-holder-frames 27, 37 are relatively small, several frames can be fabricated in one die-caster. To fabricate 3 perforated frames 27 and 3 tube-holder-frames 37 at one injection, a large die-caster 61 handling 6 molders is fabricated as shown in FIG. 16. The die-caster 61 consists of perforated frame fabrication molders 62, tube holding fabrication molders 63, molten plastic distributor 66, molten plastic inlet port 67, molten plastic injector 68, support system (embedded in the die caster), and cast release system (embedded in the die caster). The molders are the ones shown in FIGS. 8-1 and 9-1. The cast release system releases the casted perforated frames 18 and tube-holder-frames 22 out of the die-caster and the injector of molten plastics 68 transfers the molten plastic injected from the injection system to the molten plastics distributor 66, which distributes the molten plastics to every hollowed perforated frames 65 and tube-holder-frames 64 carved in the perforated frame fabrication 62 and tube-holder-frame fabrication molders 63. The functions of support system are to receive the molten plastics injected from the injection system at the entrance of the receiver 67 and to transfer the molten plastics to every hollowed perforated 65 and tube-holder-frames 64 after passing through the distribute controlling lines 66. And also the support system has the functions of cooling molten plastics by circulating cold water surrounding the molten plastics filled every hollowed frames and ejecting the cooled frames from the frame fabrication molders 62, 63.

<Assembly of Cup-Shaped Hole Perforated Frames, Tube-Holder-Frames, and Spiral Corrugated Tubes>

Figure 7:
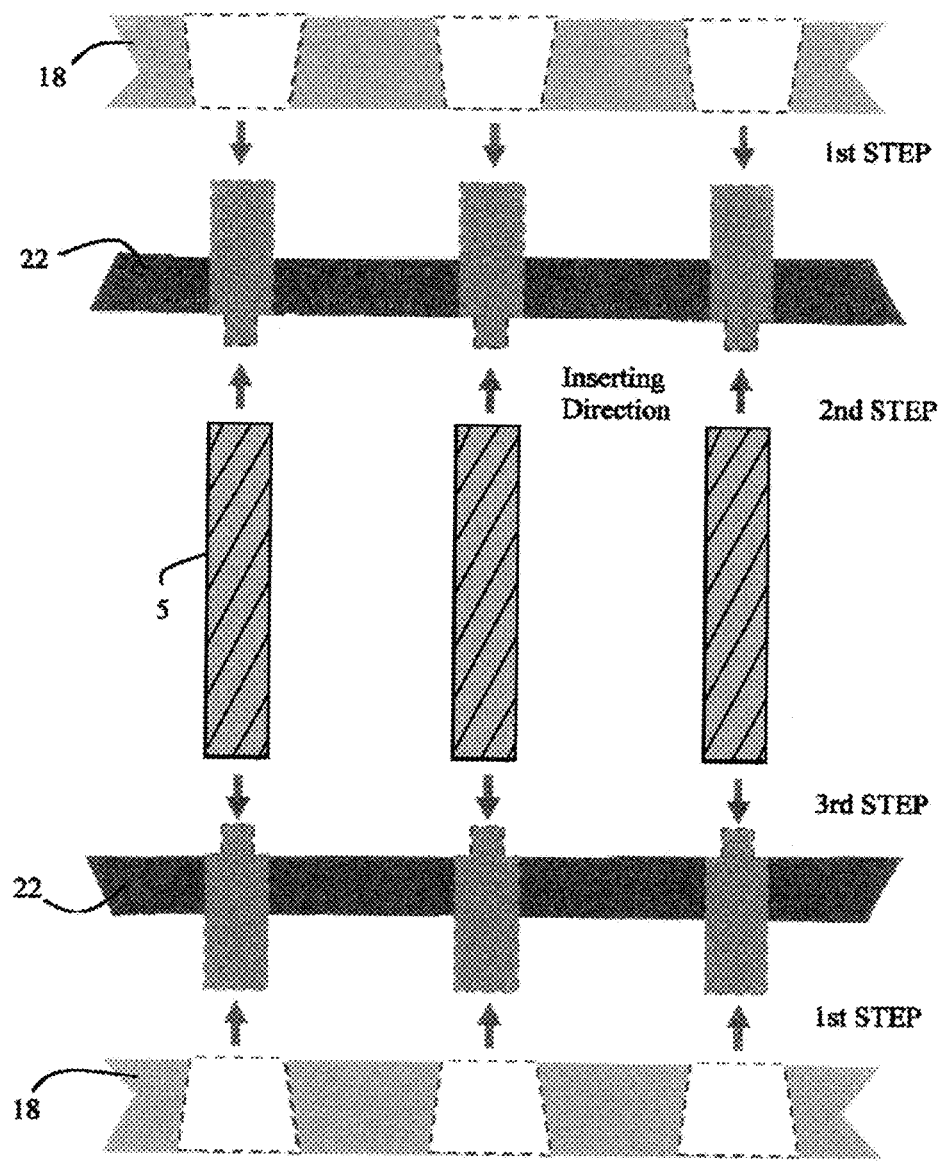
FIG. 7 is an assembling procedure of top and bottom cup-shaped hole perforated frames, tube holders, and plastic spiral corrugated tubes.

Following the assembly procedure Step 1 to 3 shown in FIG. 7, the assembly of cup-shaped hole perforated frames 18, tube-holder-frames 22, and spiral corrugated tubes 5 is performed to fabricate the PTSF 1. The Step 1 of the assembly procedure is the stage joining the cup-shaped hole perforated frames and tube-holder-frames 18, 22. To do this, the tube holders 8 and male push-fit band connector 23 of the tube-holder-frame 22 are properly aligned with the cup-shaped cylindrical holes 19 and female push-fit band connector 20 of the cup-shaped hole perforated frame 18 and then inserted into them by pressing. By doing so, the tube holder and cup-shaped hole perforated frames 22, 18 are firmly joined together. The completion of their insertion fabricates the perforated tube-holder-frame 22: ring-shaped hole perforated frame 2, as the insertion of tube holders into the holes on cup-shaped hole perforated frame creates a ring-shaped hole as shown in FIG. 3-3. In the Step 2, the ring-shaped hole perforated frame 2 is assembled with the spiral corrugated tubes 5. Their assemblies start by inserting of one side female edge of the spiral corrugated tube 5 into the male push-fit tube connector 9 of the ring-shaped hole perforated frame 2. The inserting process of tube in Step 2 continues until the insertion of all male push-fit tube connectors 9 of the ring-shaped hole perforated frame 2 into one side female edges of spiral corrugated tubes 5 is completed and then Step 3, the insertion process of the other side of tubes 5, starts. On completion of Step 2 and 3, the insertion processes of both side edges of tubes 5, the unit fill medium of SCTSF 1 shown in FIGS. 1 and 3-1 is fabricated.

In conclusion, the plastic-tube-screen-fill and plastic-tube-screen-fill pack of the present invention are invented to eliminate a problem to cause a high manufacturing cost of plastic rod screen fill pack, to improve the drawbacks of the gas and liquid contactors, to provide a manufacturing method of gas and liquid contactors using plastic tubes, to provide new cooling fill media for replacement of current commercial evaporative cooling media able to reduce construction and maintenance cost of the current cooling tower, and to provide new cooling pads to be employed for construction and replacement of current cooling pads of livestock confined facilities able to increase cooling efficiency and to remove ammonia gas ventilating to atmosphere out of the facilities. The plastic-rod-screen-fill consisting of top and bottom perforated frames and plastic rods with spiral corrugated grooves on their surfaces suspended to between the top and bottom perforated frames is fabricated by assembly of PTSF parts, cup-shaped hole perforated frames, tube-holder-frames, and spiral corrugated tubes by following the PTSF parts assembly procedure. By assembling side by side of a number of PTSFs, the PTSF packs are fabricated. Eventually, the PRSF packs are comprised of top and bottom ring-shaped hole perforated plates and spiral corrugated tubes vertically suspended to between the top and bottom perforated plates. The top and bottom plates of the PTSF packs have structures of ring-shaped hole perforated plates consisting of ring-shaped holes surrounding the solid rods placed at the center of the ring-shaped hole. The ring-shaped hole perforated plate direct all of water supplied on the perforated plate to be uniformly imbibed through the ring-shaped holes to flow down on the surface of the spiral corrugated tubes, connected with the solid rods at the center of the ring-shaped holes, by the surface tension of the rods. Therefore, the PTSF packs are concluded to be unique gas and liquid contactors comprising of top perforated plate made of ring-shaped holes with tubes placed at the center of the ring-shaped holes, which have a function of supplied water over the ring-shaped hole perforated plate to be imbibed through the entire ring-shaped holes to flow down on the surfaces of the tubes and have not ever been employed in the previous gas and liquid contactors. While the present invention has been described as having an exemplary design, this invention may be further modified within the concept and scope of this disclosure. This application is therefore intended to cover any variations, uses, or adaptations of the invention using its general principles.

Further, this application is intended to cover such departures from the present disclosure as come within known or customary practice in the art to which this invention relates.

What is claimed is:

1. A plastic-tube-screen-fill in the shape of a tube screen plate, comprising top and bottom ring-shaped hole perforated frames and a number of tubes vertically suspended between the top and the bottom ring-shaped hole perforated frames, wherein the top and the bottom ring-shaped hole perforated frames are formed of a number of ring-shaped holes, and wherein the ring-shaped holes close to the both edges of the ring-shaped hole perforated frame are spaced from the edges at a shorter distance than regular spacing between the adjacent ring-shaped holes within the middle of the ring-shaped hole perforated frame and the distances between the both edges and the ring-shaped holes close to the both edges are different from each other.

2. The plastic-tube-screen-fill of claim 1, wherein a number of tubes vertically suspended between the top and bottom ring-shaped hole perforated frames are formed of by joining male push-fit tube connectors of the ring-shaped hole perforated frame with one ends of the tubes and then joining the other ends of the tubes with the male push-fit tube connectors of another ring-shaped hole perforated frame to accomplish the plastic-tube-screen-fill by aligning and inserting each of the male push-fit tube connectors of the ring-shaped hole perforated frame into the ends of the tubes by pressing the male push-fit tube connector into the end of the tube.

3. The plastic-tube-screen-fill of claim 1, wherein the ring-shaped hole perforated frame comprises a number of ring-shaped holes with tube holders at the center of the ring-shaped holes by fixing the tube holders on the inside surface of the ring shaped holes using bars and push-fit tube connectors stuck out of the underside of the ring-shaped hole perforated frame, and wherein the push-fit tube connectors are positioned at the same locations with the locations of the ring-shaped holes of the ring-shaped hole perforated frame.

4. A plastic-tube-screen comprising top and bottom ring-shaped hole perforated frames and a number of tubes vertically suspended between the top and bottom ring-shaped hole perforated frames, wherein a number of tubes are horizontally lined up along the length of the perforated frame, and wherein the tube close to the both sides of the plastic-tube-screen-fill is spaced from the side at a shorter distance than regular spacing between the adjacent tubes within the middle of the plastic-tube screen-fill and the distances between the both sides and the tubes close to the both sides are different from each other.

5. A plastic-tube-screen-fill comprising top and bottom ring-shaped hole perforated frames and a number of tubes vertically suspended between the top and the bottom ring-shaped hole perforated frames, wherein the top and the bottom ring-shaped hole perforated frames are formed of a number of ring-shaped holes formed surrounding solid rods of tube holders positioned at the center of the ring-shaped holes by fixing the solid rod on the inside surface of the ring-shaped hole using bars, wherein a number of ring-shaped holes are positioned at regular spacing between adjacent ring-shaped holes along the length of the ring-shaped hole perforated frame, and wherein a number of attachment tabs are made on both end side surfaces, top end side surfaces, and end surfaces of the ring-shaped hole perforated frame near to the end of the ring-shaped hole perforated frame.

6. The plastic-tube-screen-fill of claim 5, wherein the tube holder is comprised of the solid rod as an upper part of the tube holder and a male push-fit tube connector as a lower part of the tube holder.

7. The plastic-tube-screen-fill of claim 5, wherein the ring-shaped hole perforated frames are formed of cup-shaped hole perforated frames and tube-holder-frames.

8. The plastic-tube-screen-fill of claim 7, wherein the top and bottom cup-shaped hole perforated frames are in a same configuration and comprised of a number of cup-shaped holes placed at the same location with the locations of the ring-shaped holes of the ring-shaped hole perforated frame along the length of the cup-shaped hole perforated frame.

9. The plastic-tube-screen-fill of claim 7, wherein the tube-holder-frame is comprised of a male push-fit band connector of the tube-holder-frame and a number of tube holders placed at the same locations with the locations of the ring-shaped holes of the ring-shaped hole perforated frame along the length of the tube-holder-frame.

10. The plastic-tube-screen-fill of claim 5, wherein the ring-shaped holes are formed of the solid rods within cup-shaped holes by joining the tube holders of a tube-holder-frame into their counterpart cup-shaped holes of a cup-shaped hole perforated frame by pressing the tube-holder-frame into the cup-shaped hole perforated frame, after aligning and inserting of male push-fit band connector of the tube-holder-frame into their counterpart female push-fit band connector on the underside of the cup-shaped hole perforated frame.

11. The plastic-tube-screen-fill of claim 10, wherein the female push-fit band connector is placed along the longitudinal axis of the cup-shaped hole perforated frame passing through the centerlines of the cup-shaped holes on the underside of the cup-shaped hole perforated frame.

12. The plastic-tube-screen-fill of claim 10, wherein the male push-fit band connector is placed along the longitudinal axis of the tube-holder-frame passing through the centerlines of the male push-fit tube connectors of the tube holders of the tube-holder-frame.

13. The plastic-tube-screen-fill of claim 5, wherein the attachment tabs for use in assembly of the plastic-tube-screen-fills for fabricating of a plastic-tube-screen-fill pack include female and male attachment tabs to be properly placed on the both end side surfaces of the top and bottom plastic-tube-screen-fill perforated frames, at the same spacing apart from both ends of the plastic-tube-screen-fill perforated frame in order to be easily joined by aligning and inserting the attachment tabs into their counterpart attachment tabs of the adjacent plastic-tube-screen-fill by pressing them.

14. The plastic-tube-screen-fill of claim 5, wherein the attachment tabs for use in attaching of the plastic-tube-screen-fill packs on side of other plastic-tube-screen-fill packs include male and female attachment tabs respectively positioned on one end surface and the other end surface of the top and bottom ring-shaped hole perforated frames.

15. The plastic-tube-screen-fill of claim 5, wherein the attachment tabs for use in piling of the plastic-tube-screen-fill packs on the top of other plastic-tube-screen-fill packs, male and female attachment tabs, are respectively positioned on end side top and bottom surfaces of the top and bottom ring-shaped hole perforated frames.

16. A plastic-tube-screen-fill pack comprising top and bottom ring-shaped hole perforated plates and a plurality of tubes vertically suspended between the top and bottom ring-shaped hole perforated plates, wherein the top and bottom ring-shaped hole perforated plates are formed of a plurality of ring-shaped holes formed surrounding the end closed portion of the tubes positioned at the center of the ring-shaped holes, and wherein both end closed portions of the tubes are suspended to the centers of the ring-shaped holes on the top and bottom ring-shaped hole perforated plates by fixing the end closed portion of the tubes on the inside surfaces of the ring-shaped holes using bars.

17. The plastic-tube-screen-fill pack of claim 16, wherein a plurality of ring-shaped holes on the ring-shaped hole perforated plates and a plurality of tubes vertically suspended between top and bottom ring-shaped hole perforated plates are formed in zigzag configurations by assembling side by side of the plastic-tube-screen-fills after horizontally rotating of every other plastic-tube-screen-fills to accomplish the plastic-tube-screen-fill pack.

* * * * *